(12) United States Patent
Honda et al.

(10) Patent No.: US 12,313,566 B2
(45) Date of Patent: May 27, 2025

(54) DEFECT INSPECTION DEVICE AND DEFECT INSPECTION METHOD

(71) Applicant: Hitachi High-Tech Corporation, Tokyo (JP)

(72) Inventors: Toshifumi Honda, Tokyo (JP); Yuta Urano, Tokyo (JP); Shunichi Matsumoto, Tokyo (JP); Hisaaki Kanai, Tokyo (JP)

(73) Assignee: Hitachi High-Tech Corporation, Tokyo (JP)

( * ) Notice: Subject to any disclaimer, the term of this patent is extended or adjusted under 35 U.S.C. 154(b) by 229 days.

(21) Appl. No.: 17/630,264

(22) PCT Filed: Aug. 2, 2019

(86) PCT No.: PCT/JP2019/030561
§ 371 (c)(1),
(2) Date: Jan. 26, 2022

(87) PCT Pub. No.: WO2021/024319
PCT Pub. Date: Feb. 11, 2021

(65) Prior Publication Data
US 2022/0291140 A1 Sep. 15, 2022

(51) Int. Cl.
*G01N 21/95* (2006.01)
*G01N 21/88* (2006.01)

(52) U.S. Cl.
CPC . *G01N 21/9501* (2013.01); *G01N 2021/8812* (2013.01); *G01N 2021/8848* (2013.01)

(58) Field of Classification Search
CPC ... G01N 2021/8812; G01N 2021/8848; G01N 21/9501; G02B 13/22

(Continued)

(56) References Cited

U.S. PATENT DOCUMENTS 7,525,649 B1 4/2009 Leong et al.
8,922,764 B2 12/2014 Urano et al.
(Continued)

FOREIGN PATENT DOCUMENTS

JP H8201306 A 8/1996
JP H10-123429 A 5/1998
(Continued)

OTHER PUBLICATIONS

Search Report mailed Nov. 5, 2019 in International Application No. PCT/JP2019/030561.
(Continued)

*Primary Examiner* — Sunghee Y Gray
(74) *Attorney, Agent, or Firm* — Miles & Stockbridge, P.C.

(57) ABSTRACT

A defect inspection device includes an illumination unit that irradiates a sample with a linear illumination spot; a condensing detection unit that condenses reflected light of the illumination spot from the sample; and a sensor unit that forms an optical image on a light reception surface, and outputs the optical image as an electrical signal. An angle α formed between an optical axis of the condensing detection unit and a longitudinal direction of the linear illumination spot is 10° or more and less than 80°. The sensor unit is a line sensor provided with an array-like light reception unit at a position conjugate with the illumination spot. An angle β formed between direction of the line sensor and the optical axis of the condensing detection unit is 10° or more and less than 80°, and has a difference from the angle α of 5° or more.

12 Claims, 16 Drawing Sheets

(58) Field of Classification Search
USPC .................................................... 356/237.2
See application file for complete search history.

(56) References Cited

U.S. PATENT DOCUMENTS

| | | | |
|---|---|---|---|
| 9,568,439 | B2 | 2/2017 | Honda et al. |
| 2005/0052644 | A1 | 3/2005 | Lewis et al. |
| 2005/0105791 | A1 | 5/2005 | Lee et al. |
| 2006/0290923 | A1 | 12/2006 | Nakano et al. |
| 2009/0059216 | A1 | 3/2009 | Shibata et al. |
| 2009/0185179 | A1 | 7/2009 | Hill |
| 2009/0279081 | A1* | 11/2009 | Urano ............... G01N 21/9501 |
| | | | 356/237.5 |
| 2013/0114078 | A1 | 5/2013 | Honda et al. |
| 2013/0176552 | A1 | 7/2013 | Brown et al. |
| 2013/0301042 | A1 | 11/2013 | Urano et al. |
| 2013/0301904 | A1 | 11/2013 | Lee et al. |
| 2014/0253719 | A1 | 9/2014 | Rueb |
| 2014/0268122 | A1* | 9/2014 | Matsumoto ........ G01N 21/9501 |
| | | | 356/237.6 |
| 2014/0368618 | A1 | 12/2014 | Ushinaga et al. |
| 2015/0071316 | A1 | 3/2015 | Chuang |
| 2015/0146200 | A1 | 5/2015 | Honda et al. |
| 2016/0139059 | A1 | 5/2016 | Matsumoto et al. |
| 2017/0146463 | A1* | 5/2017 | Honda ............... G01N 21/9501 |
| 2020/0256804 | A1 | 8/2020 | Honda et al. |
| 2022/0357285 | A1 | 11/2022 | Honda et al. |
| 2023/0175978 | A1 | 6/2023 | Urano et al. |
| 2024/0230551 | A9 | 7/2024 | Urano et al. |

FOREIGN PATENT DOCUMENTS

| | | | |
|---|---|---|---|
| JP | 2007-033433 | A | 2/2007 |
| JP | 200733433 | A | 2/2007 |
| JP | 2009-053132 | A | 3/2009 |
| JP | 2009-236791 | A | 10/2009 |
| JP | 201221994 | A | 2/2012 |
| JP | 2012-137350 | A | 7/2012 |
| JP | 2014-534611 | A | 12/2014 |
| JP | 2015-028457 | A | 2/2015 |
| JP | 2015-197320 | A | 11/2015 |
| JP | 2016-027342 | A | 2/2016 |
| JP | 2019-133176 | A | 8/2019 |
| WO | 2007110672 | A1 | 10/2007 |
| WO | 2013094121 | A1 | 6/2013 |
| WO | 2013161912 | A1 | 10/2013 |
| WO | 2018216277 | A1 | 11/2018 |
| WO | 2019064991 | A1 | 4/2019 |
| WO | 2020136697 | A1 | 7/2020 |
| WO | 2021029025 | A1 | 2/2021 |

OTHER PUBLICATIONS

Written Opinion mailed Nov. 5, 2019 in International Application No. PCT/JP2019/030561.
International Preliminary Report in Patentability mailed Jun. 7, 2021 in International Application No. PCT/JP2019/030561.
Search Report mailed Apr. 27, 2021 in International Application No. PCT/JP2021/003285.
Written Opinion mailed Apr. 27, 2021 in International Application No. PCT/JP2021/003285.
International Preliminary Report on Patentability mailed Nov. 11, 2021 in International Application No. PCT/JP2021/003285.
International Preliminary Report Patentability mailed Aug. 3, 2023 in International Application No. PCT/JP2021/003285.
Search Report mailed Aug. 4, 2020 in International Application No. PCT/JP2020/015161.
Written Opinion mailed Aug. 4, 2020 in International Application No. PCT/JP2020/015161.
Non-Final Office Action mailed Sep. 18, 2024 in U.S. Appl. No. 17/913,553.

* cited by examiner

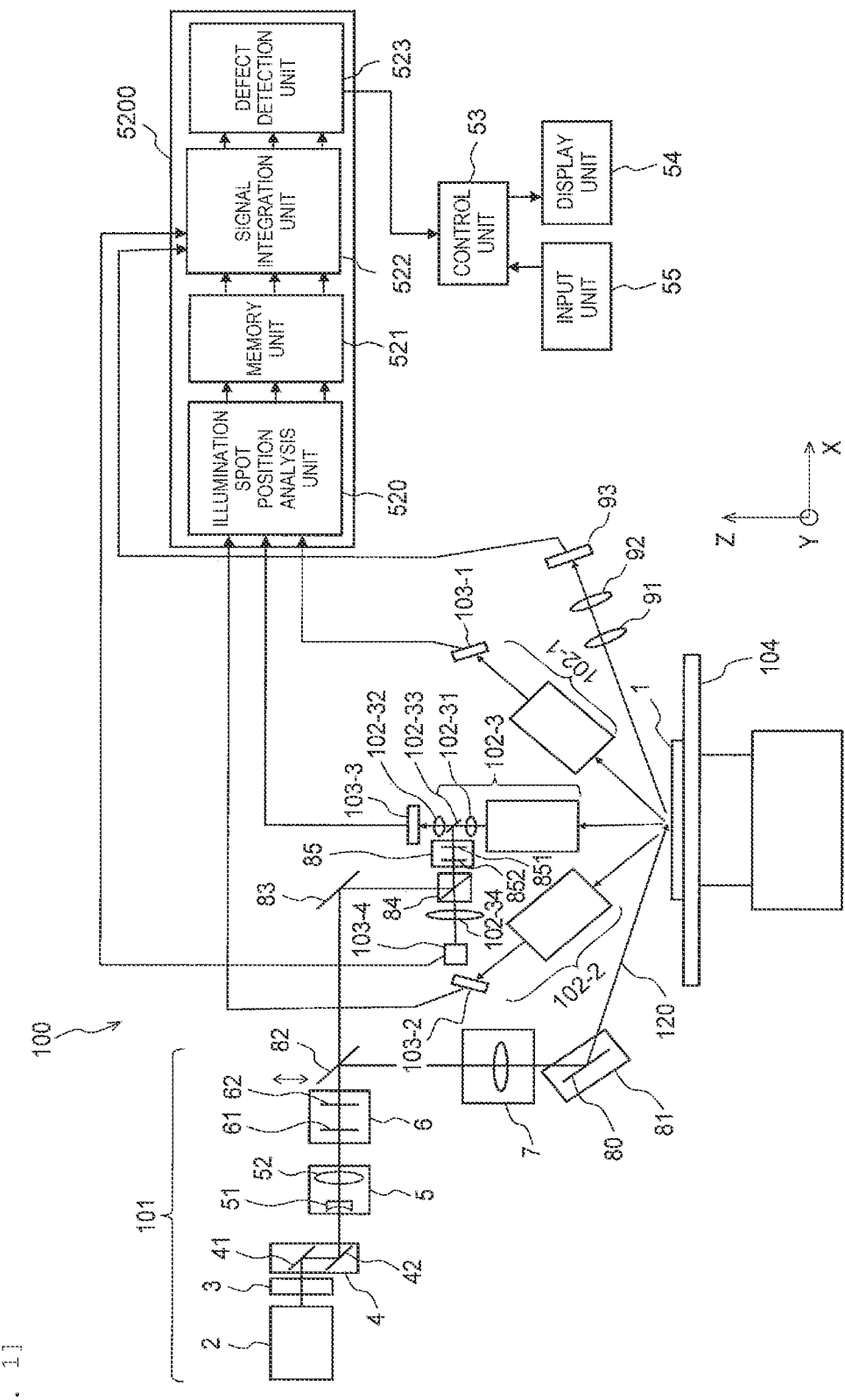

[FIG. 2A]
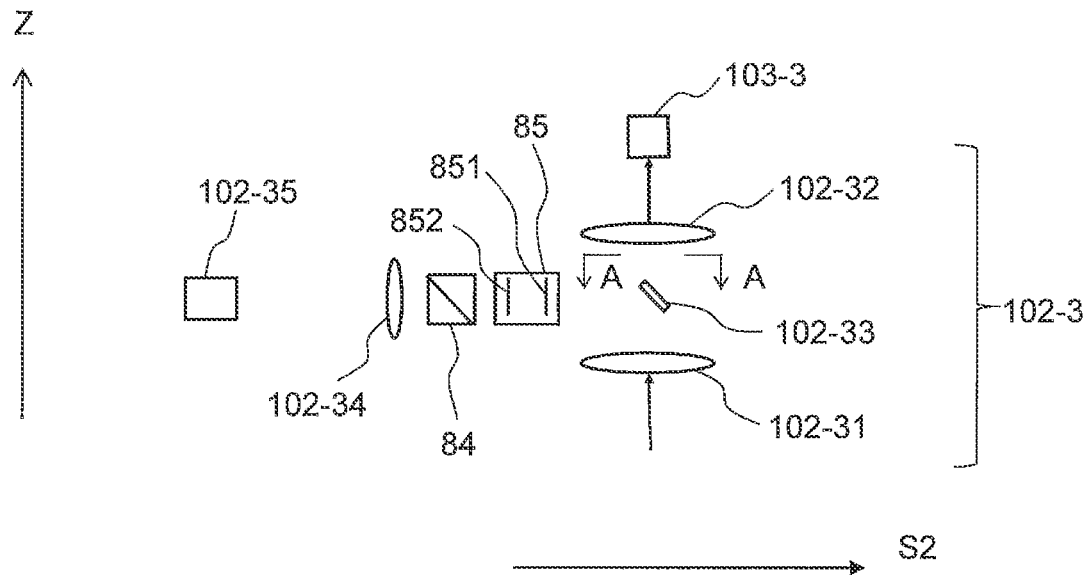
[FIG. 2B]
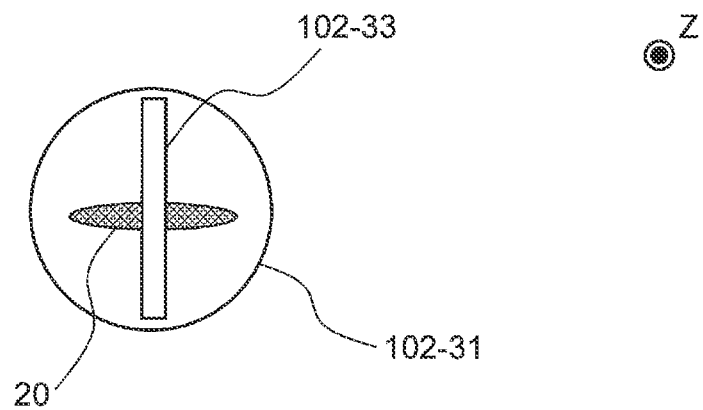

[FIG. 3]
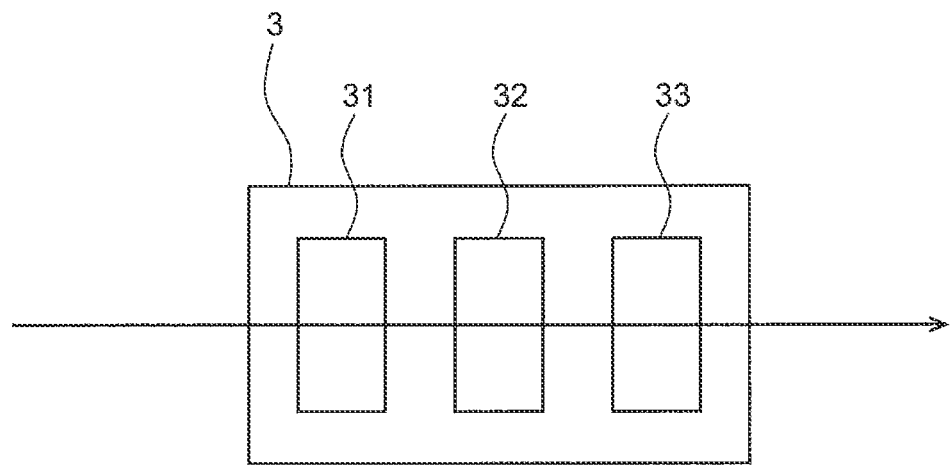

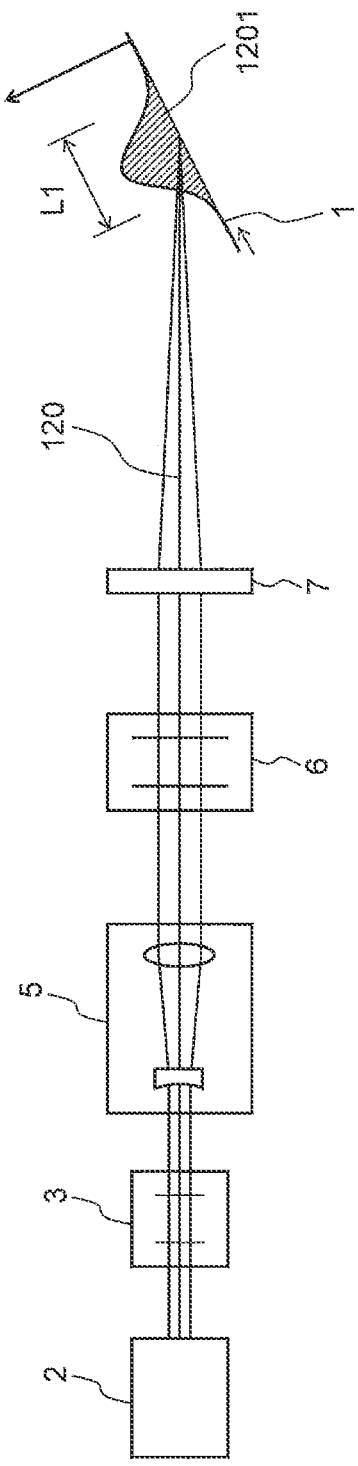
[FIG. 4]

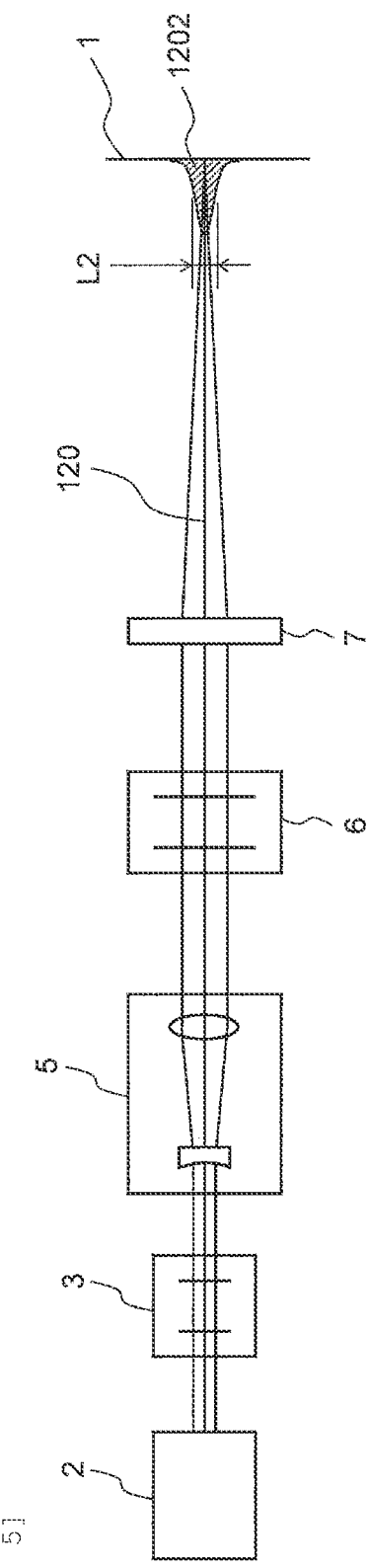
[FIG. 5]

[FIG. 6]
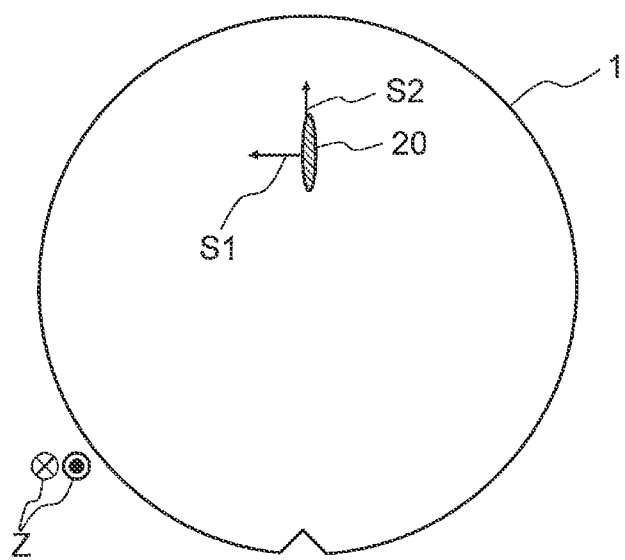

[FIG. 7]
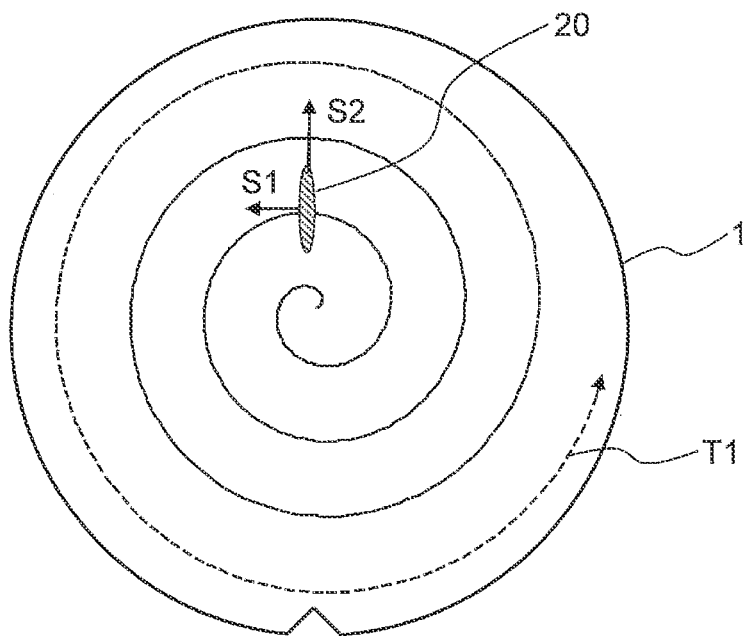
[FIG. 8]
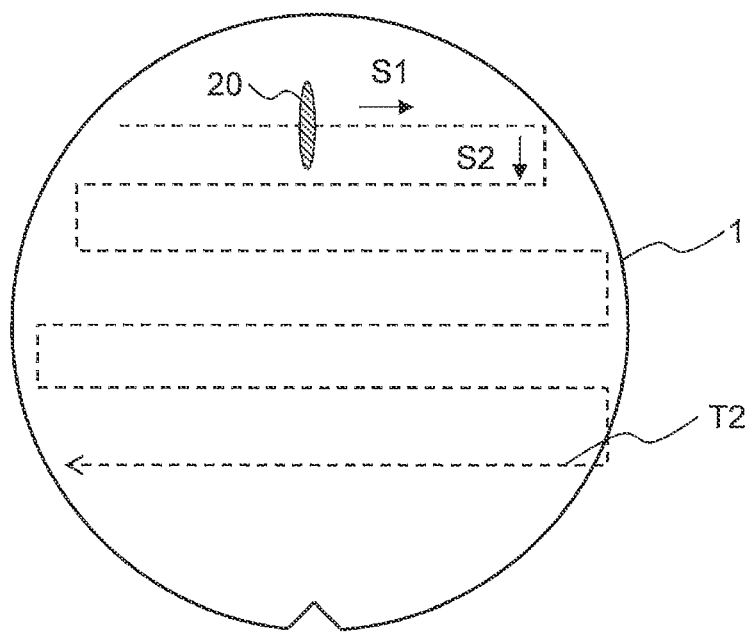

[FIG. 9A]
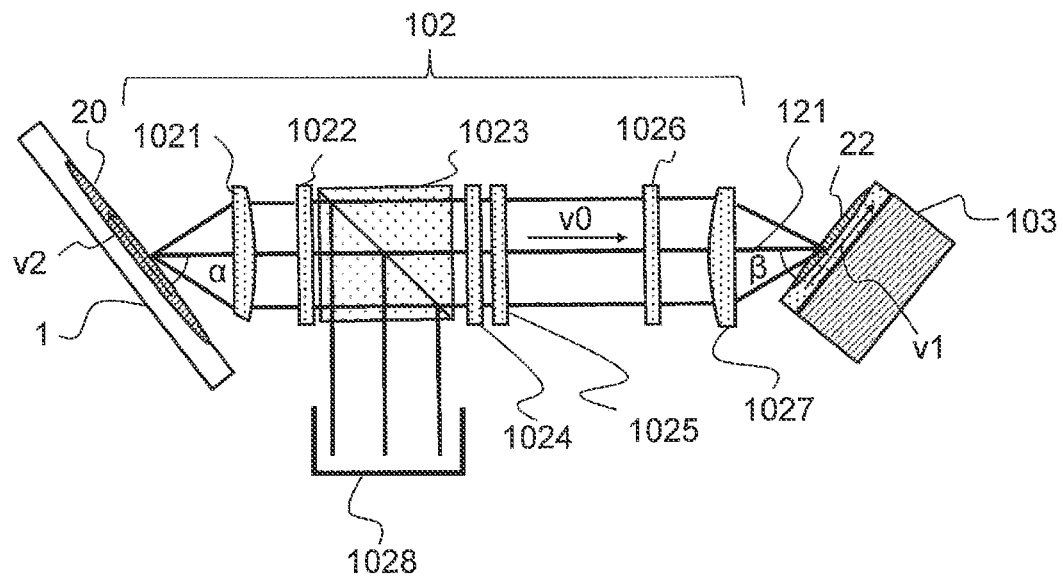
[FIG. 9B]
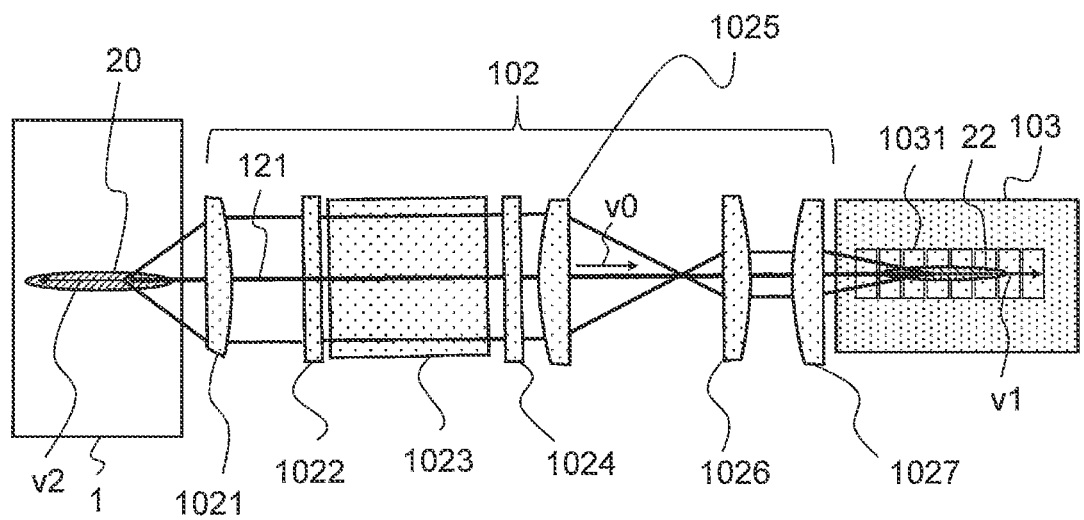

[FIG. 9C]
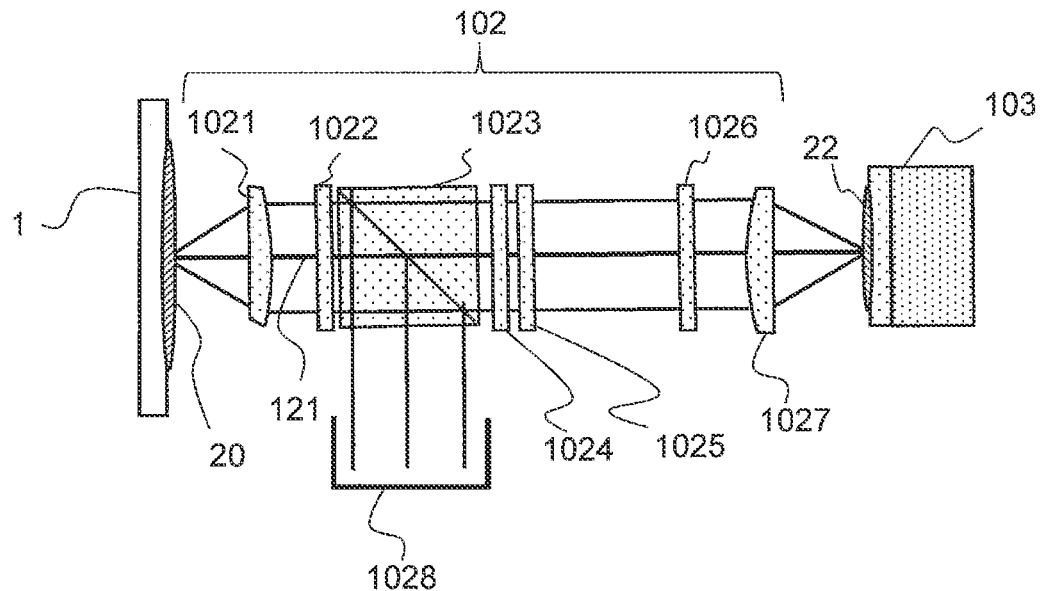
[FIG. 10]
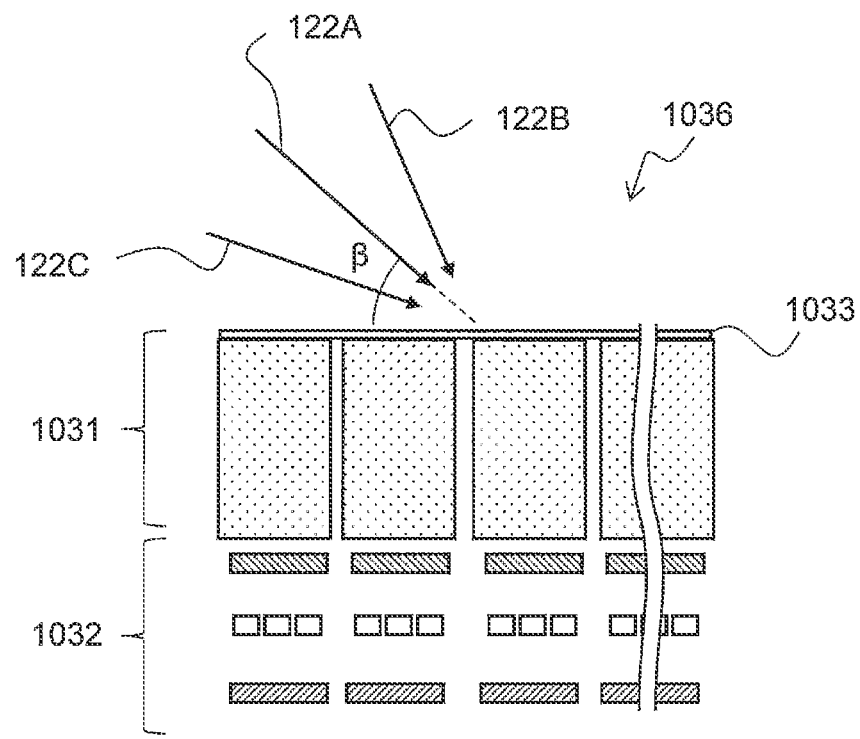

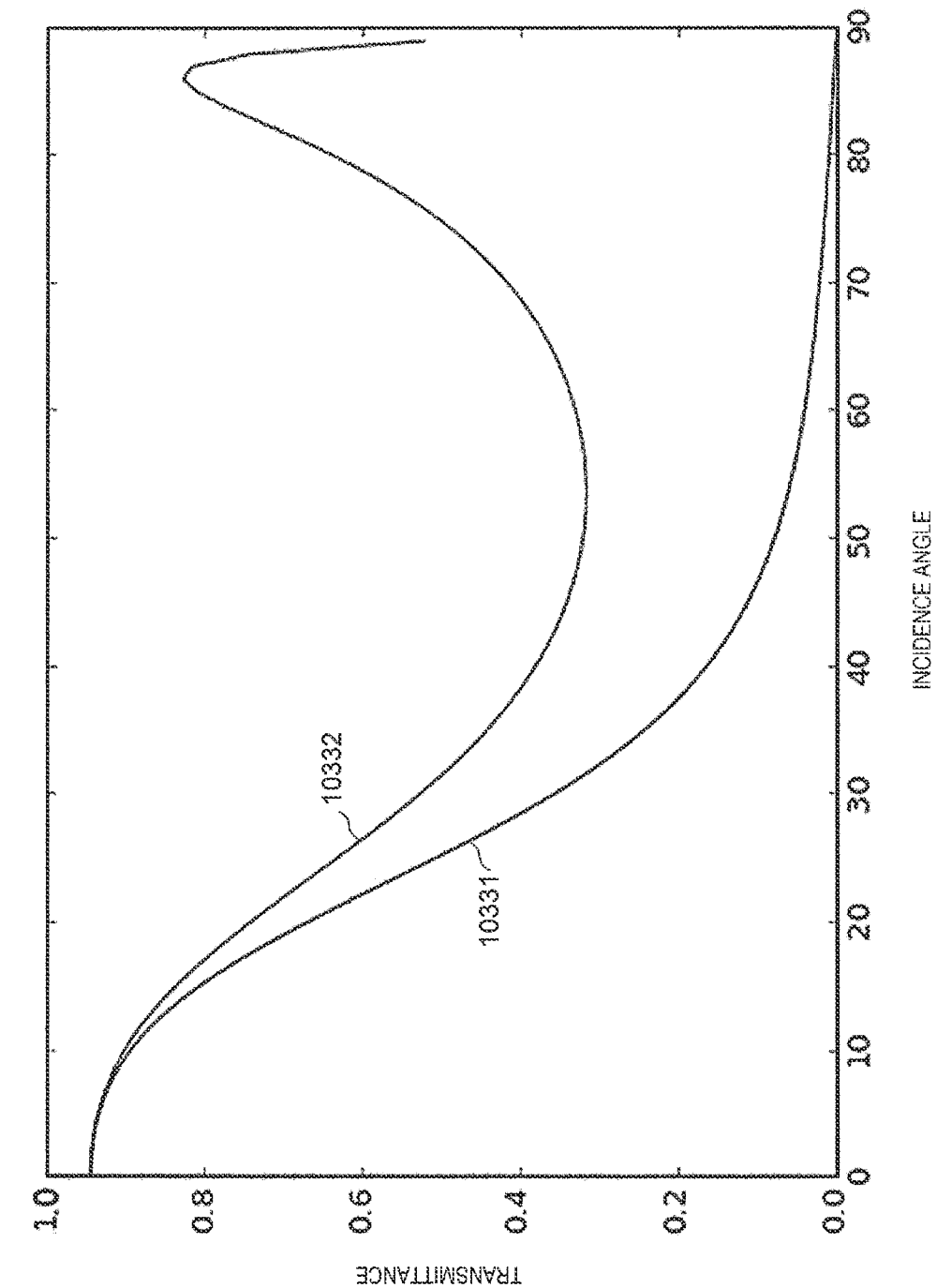
[FIG. 11]

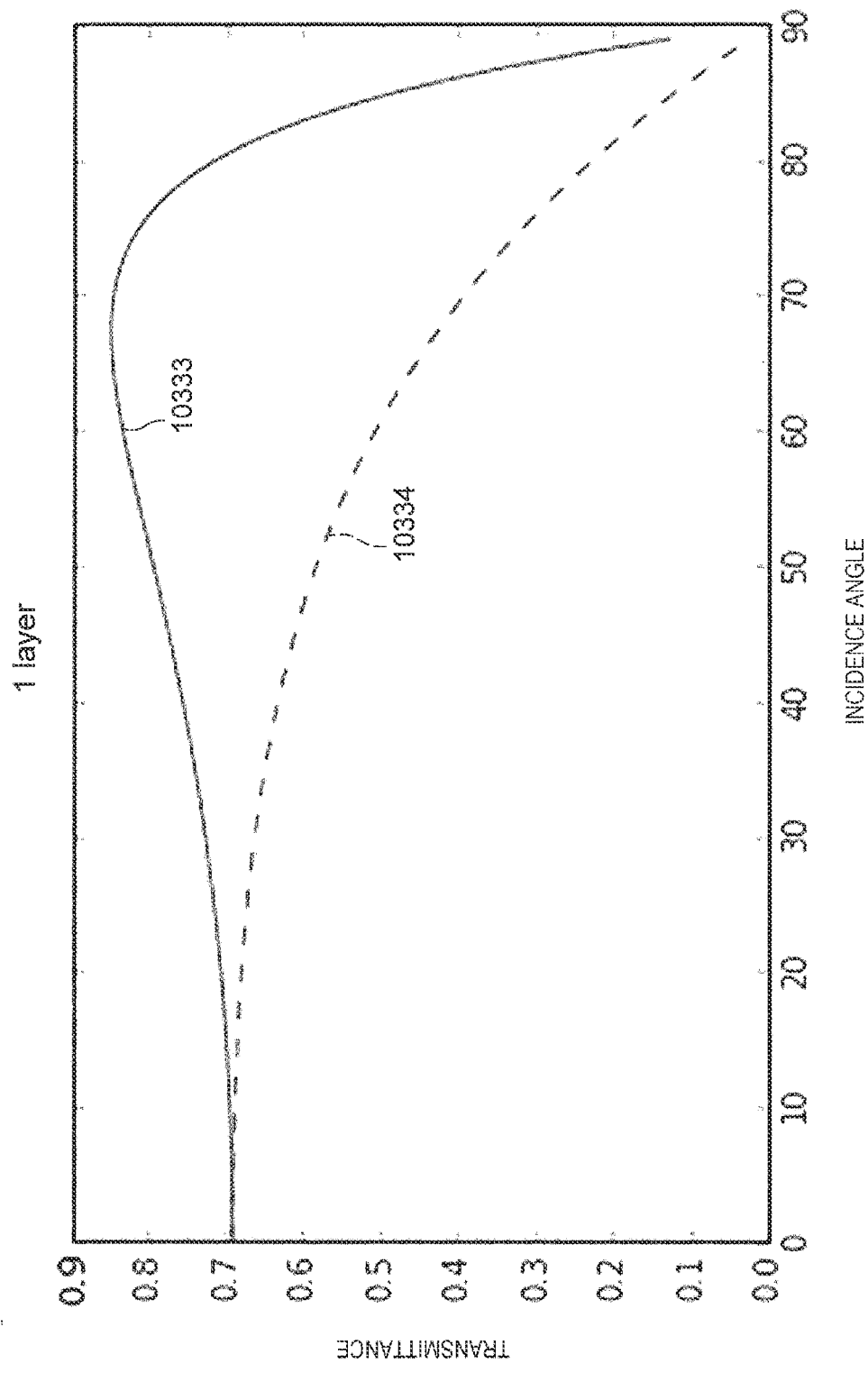
[FIG. 12A]

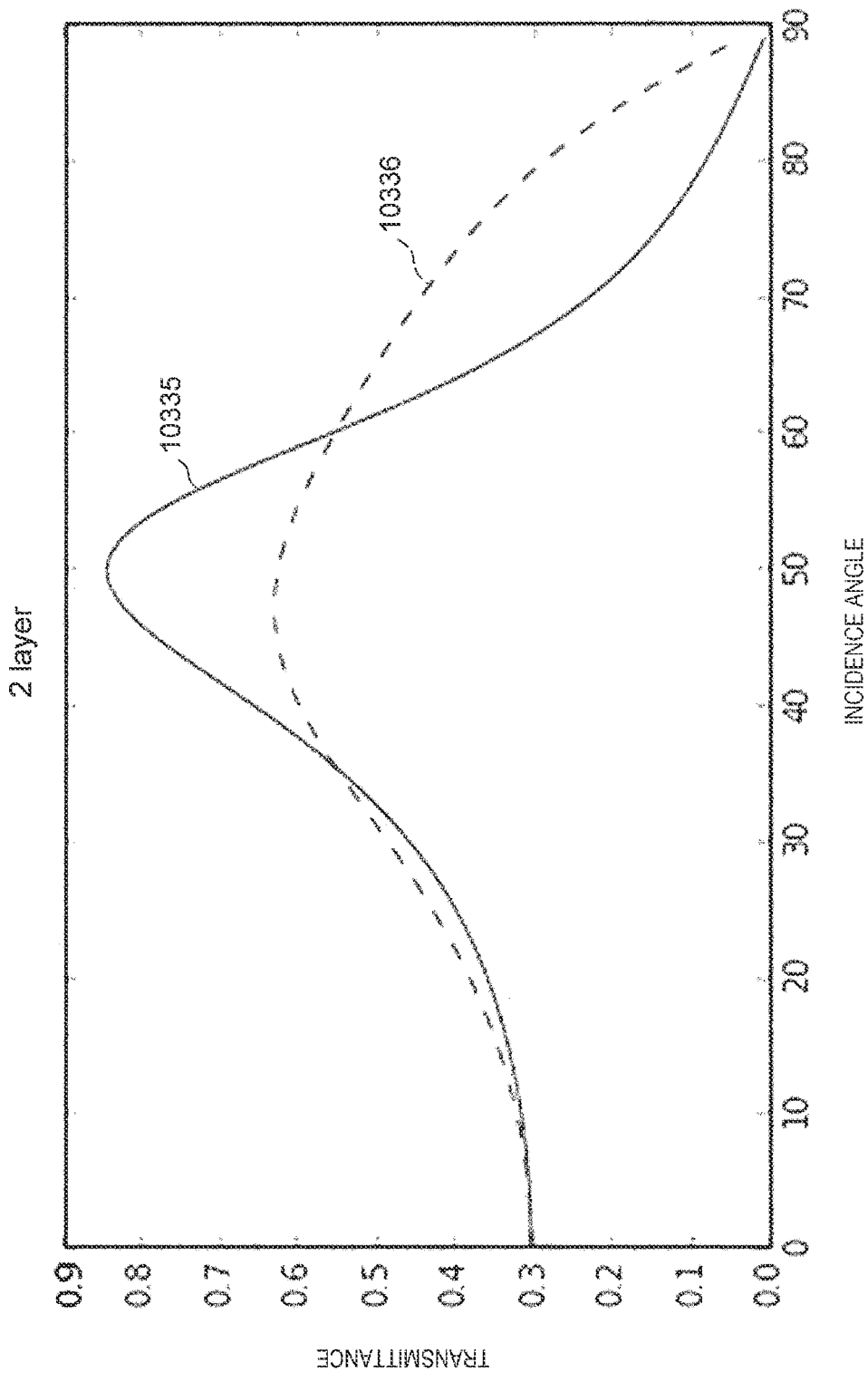
[FIG. 12B]

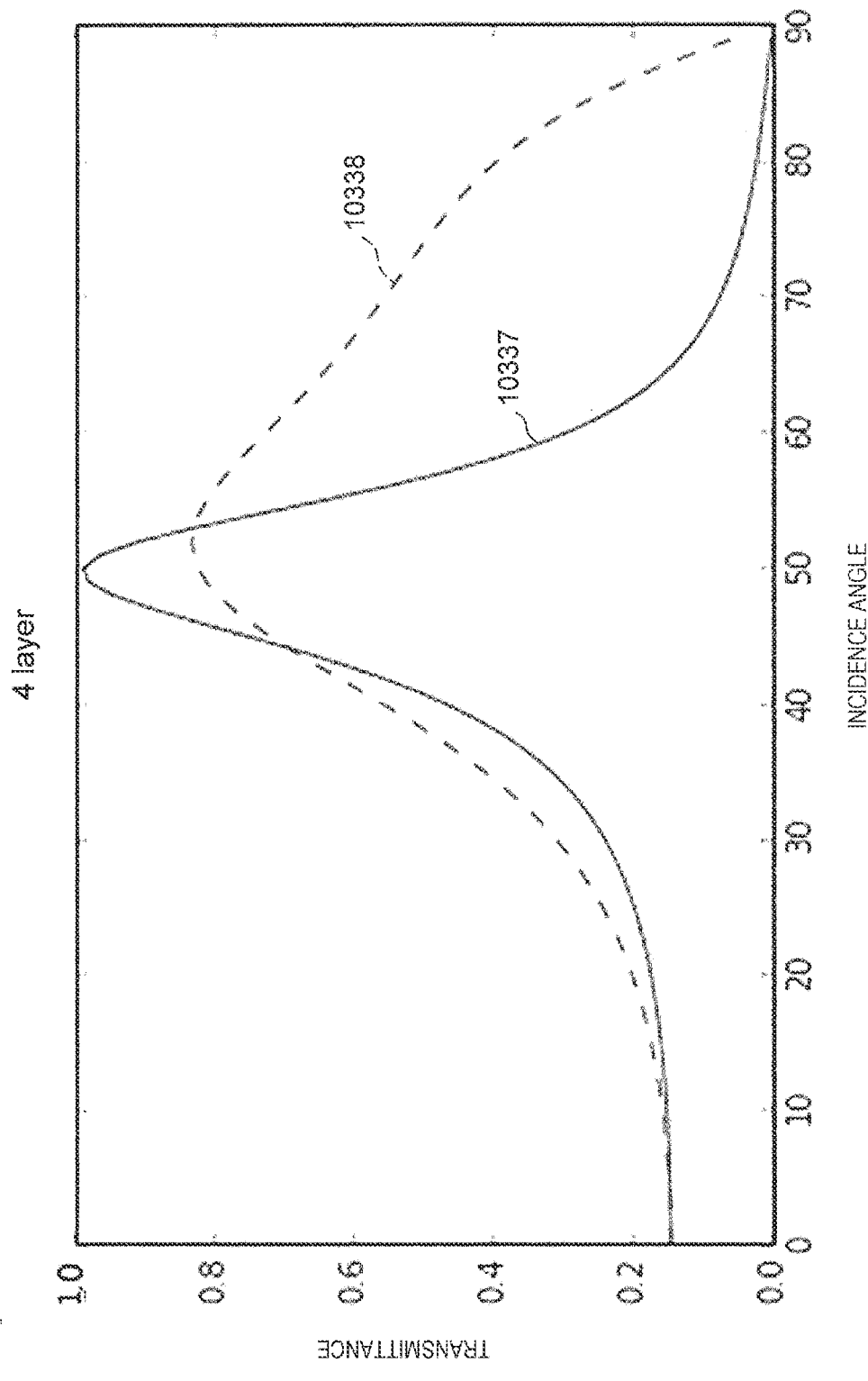
[FIG. 12C]

[FIG 13]
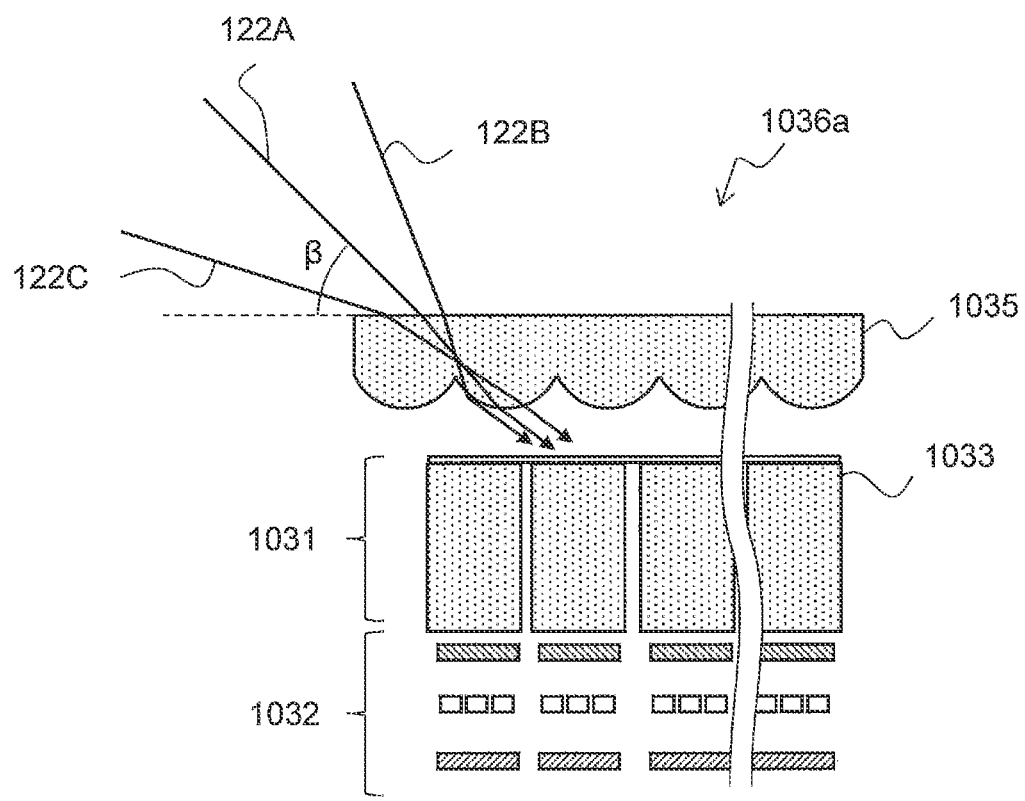

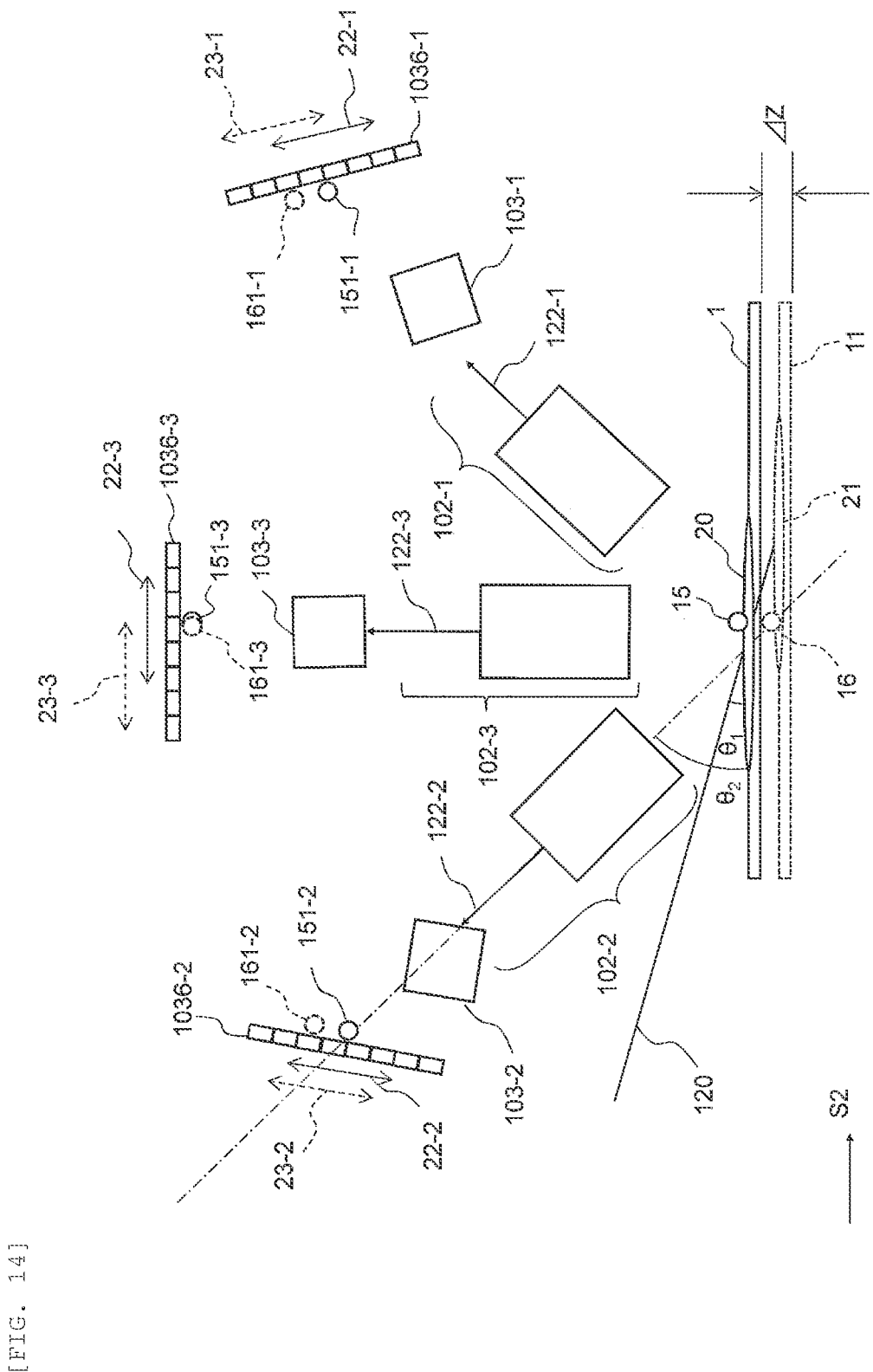
[FIG. 14]

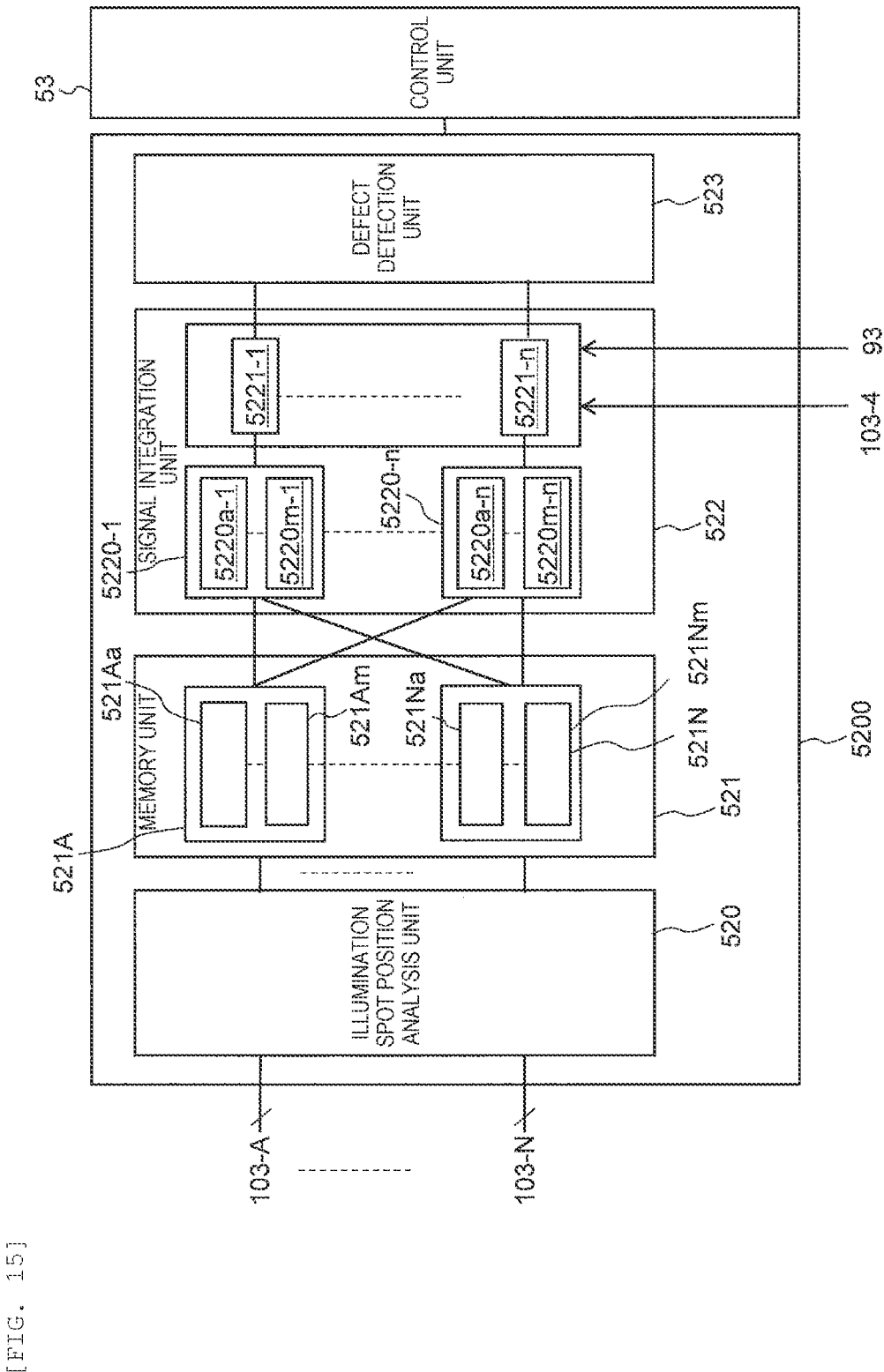
[FIG. 15]

DEFECT INSPECTION DEVICE AND DEFECT INSPECTION METHOD

TECHNICAL FIELD

The present invention relates to a defect inspection device and a defect inspection method for inspecting a minute defect existing on a surface of a sample, and determining and outputting a position, a type and a dimension of the defect.

BACKGROUND ART

In order to maintain or enhance a yield of a product in a manufacturing line for a semiconductor substrate, a thin film substrate or the like, an inspection of a defect that exists on a surface of the semiconductor substrate, the thin film substrate or the like is performed. Defect inspection used in a manufacturing process of a semiconductor or the like is required to detect a minute defect. In order to optically detect the minute defect, it is necessary to irradiate the defect with a large quantity of light, condense as much scattered light generated from the defect as possible to form an image, and detect the defect. As a technique of the related art for the defect inspection, for example, a technique described in PTL 1 is known.

In PTL 1, in order to accurately detect a small number of photons from a minute defect, a plurality of detection systems is arranged to be tilted with respect to a surface of a sample, and an image of linear illumination irradiated on the surface of the sample is formed at a sensor position by each detection system to determine the defect. When an optical system is arranged such that all reflected light from the defect can be detected, a working distance between a detection unit and a linear illumination unit on the surface of the sample changes in a visual field. In such a case, defocus is caused, and the resolution of the image formed on a sensor surface decreases. In order to prevent a decrease in the resolution, in PTL 1, an aperture set to be large is divided and the aperture is substantially reduced, a plurality of images are formed on the sensor surface by increasing a depth of a focus, and these images are electrically combined in a subsequent stage to realize imaging detection with a prevented defocus.

CITATION LIST

Patent Literature

PTL 1: WO2018/216277

SUMMARY OF INVENTION

Technical Problem

However, in a method of PTL 1, while the aperture is divided to reduce the depth of the focus, the optical resolution may be deteriorated by dividing the aperture. The optical resolution is inversely proportional to a numerical aperture and is determined by a pixel size and an image forming magnification on the sensor surface. There is no problem in a case where the corresponding pixel size on the surface of the sample is large relative to the optical resolution. However, as the number of divisions of a light reception unit of the sensor is reduced, the problem is apparent.

Further, in the method of PTL 1, an image of the sample is formed at the sensor position for each divided pupil, an angle between a main optical axis and an illumination line changes for each image. Therefore, when images are formed on the sensor surface as it is, the magnification will change between the images corresponding to pupils, and it is necessary to adjust a lens array group or a sensor pixel size to correct the magnification, which complicates the detection system.

Therefore, the invention solves the above problem of the related art and provides a defect inspection device and a defect inspection method that realize high-sensitivity detection of a minute defect by high-resolution image forming in an inspection device under a condition that a distance between a linear illumination spot on a surface of a sample and a detection unit is not constant.

Solution to Problem

In order to solve the problem, a defect inspection device of the invention includes: an illumination optical system configured to irradiate a surface of a sample with a linear illumination spot; a condensing detection unit configured to condense reflected light of the illumination spot from the surface of the sample; a sensor unit configured to form an optical image of the illumination spot by the condensing detection unit on a light reception surface formed with an antireflection film and output the optical image as an electrical signal. The condensing detection unit includes a polarization control unit configured to control a polarization direction of incident light to branch by polarization, and a first angle formed between an optical axis of the condensing detection unit and a longitudinal direction of the linear illumination spot irradiated to the sample is 10° or more and less than 80°. A polarization direction of light of branches by the polarization control unit is a direction in which transmittance of the antireflection film is maximized. The sensor unit is a line sensor provided with an array-like light reception unit at a position conjugate with the linear illumination spot formed on the surface of the sample. A second angle formed between an arrangement direction of an array of the light reception unit of the sensor unit and the optical axis of the condensing detection unit is 10° or more and less than 80°, smaller than the first angle, and has a difference from the first angle of 5° or more.

A defect inspection method of the invention includes: a step of irradiating a surface of a sample with a linear illumination spot by an illumination optical system; a step of condensing reflected light of the illumination spot from the surface of the sample by a condensing detection unit; a step of controlling the polarization direction of light incident from the illumination spot by the polarization control unit to branch by the polarization; and a step of emitting the reflected light to a sensor unit to form an optical image of the illumination spot; and a step of outputting the optical image as an electrical signal by the sensor unit. The condensing detection unit includes a polarization control unit configured to control a polarization direction of incident light to branch by polarization, and a first angle formed between a longitudinal direction of the illumination spot and an optical axis of the condensing detection unit is 10° or more and less than 80°. In the sensor unit, a second angle formed between the optical axis of the condensing detection unit and an arrangement direction of an array of the light reception unit is 10° or more and less than 80°, smaller than the first angle, and has a difference from the first angle of 5° or more. A polarization direction of light of the branches by the polarization control unit is a direction in which the transmittance of an antireflection film on a light reception surface of the sensor unit is maximized.

Other means will be described in embodiments for carrying out the invention.

Advantageous Effect

According to the invention, in the inspection device under a condition that a distance between a linear illumination spot on a surface of a sample and a detection unit is not constant, high-resolution image forming enables high sensitivity detection of the minute defect.

BRIEF DESCRIPTION OF DRAWINGS

FIG. 1 is a block diagram showing an overall schematic configuration showing an embodiment of a defect inspection device according to a first embodiment of the invention.

FIG. 2A is a diagram showing an arrangement of an optical system.

FIG. 2B is a diagram showing an arrangement of the optical system.

FIG. 3 is a diagram showing an embodiment of the defect inspection device, and is a block diagram showing an internal configuration of an attenuator 3 of FIG. 1A.

FIG. 4 is a block diagram of an illumination unit as viewed from a direction perpendicular to a longitudinal direction of a linear illumination region on a sample.

FIG. 5 is a block diagram of the illumination unit as viewed from the longitudinal direction of the linear illumination region on the sample.

FIG. 6 is a plan view of the sample showing a state in which an illumination spot is projected onto the sample.

FIG. 7 is a plan view of a wafer showing a first example showing a locus of the illumination spot by spiral scanning.

FIG. 8 is a plan view of the wafer showing a second example showing a locus of the illumination spot by translational scanning.

FIG. 9A is a block diagram in which a configuration of a detection optical system is viewed from a cross section in an illumination longitudinal direction of linear illumination.

FIG. 9B is a block diagram in which the configuration of the detection optical system is viewed from a cross section in the illumination longitudinal direction of linear illumination.

FIG. 9C is a block diagram in which the configuration of the detection optical system is viewed from a cross section in the illumination longitudinal direction of linear illumination.

FIG. 10 is a cross-sectional block diagram of a sensor unit.

FIG. 11 is a graph showing transmittance of light to a silicon substrate when a general antireflection film including a four-layer thin film is formed on the silicon substrate.

FIG. 12A is a graph showing transmittance of light to a silicon substrate when an antireflection film according to the first embodiment of the invention is formed on the silicon substrate.

FIG. 12B is a graph showing transmittance of light to a silicon substrate when an antireflection film according to a second embodiment of the invention is formed on the silicon substrate.

FIG. 12C is a graph showing transmittance of light to a silicon substrate when an antireflection film according to a third embodiment of the invention is formed on the silicon substrate.

FIG. 13 is a block diagram of an incident light control lens array arranged on an incident side of the sensor unit according to a fourth embodiment of the invention.

FIG. 14 is a block diagram of the detection optical system illustrating positional deviation on a sensor surface due to deviation of the sample in a Z-direction according to the first embodiment of the invention.

FIG. 15 is a block diagram showing a schematic configuration of a signal processing unit.

DESCRIPTION OF EMBODIMENTS

A defect inspection device of the invention includes: a sample holder that holds a sample to be inspected; an illumination optical system that irradiates the sample held by the sample holder with light of a predetermined wavelength; a detection optical system that condenses reflected light from the sample irradiated with light and guides the reflected light to a photoelectric conversion unit; and a data processing unit that processes an output signal of the photoelectric conversion unit that detects the reflected light to extract position information of a foreign matter or a defect on the sample.

Based on the reflected light of the sample to be inspected, this data processing unit acquires deviation of an optical axis of an illumination spot, deviation of a detected image on a photoelectric conversion surface due to deviation of the sample to be inspected in a height direction, or detection timing deviation, and inspects the defect based on signal intensity between the photoelectric conversion units or a signal obtained by correcting the timing deviation between signals acquired at different timings. By detecting the defect based on the signals between the photoelectric conversion units or the signal obtained by correcting positional deviation between the signals acquired at different timings, the data processing unit realizes inspection with high speed, high sensitivity, and a good coordinate accuracy.

Embodiments of the invention will be described below with reference to drawings. The invention is not limited to the embodiments described below and includes various modifications. The embodiments described below are described in detail for easy understanding of the invention, and the invention is not necessarily limited to include all configurations described below. Further, a part of a configuration of one embodiment can be replaced with a configuration of another embodiment, and the configuration of another embodiment can be added to the configuration of the one embodiment. Further, in a part of the configurations of the embodiments, addition, deletion, or replacement of another configuration can be performed.

The following embodiments describe a case where the invention is applied to an inspection device used for defect inspection executed in a manufacturing process of a semiconductor or the like. The defect inspection device according to the invention can realize detection of a minute defect, acquisition of an inspection result regarding the number, position, dimension, and defect type of the detected defect, inspection of a large number of samples within a predetermined time, and the like.

First Embodiment

FIG. 1 is an example of a schematic configuration diagram of a defect inspection device 100 according to the present embodiment.

The defect inspection device 100 according to the present embodiment targets a sample 1 having a flat surface on which no pattern is formed on the surface, and inspects defects such as a foreign matter and a dent on a surface of the sample 1.

The defect inspection device 100 includes an illumination unit 101, condensing detection units 102-1 to 102-3, sensor units 103-1 to 103-3, a stage 104, and a sensor unit 103-4. The defect inspection device 100 further includes parts of a condenser lens 91, an image forming lens 92, a two-dimensional sensor 93, a signal processing unit 5200, a control unit 53, a display unit 54, and an input unit 55.

The control unit 53 integrally controls the defect inspection device 100 together with the display unit 54 for displaying information and the input unit 55 for inputting data, an instruction, or the like.

The sensor units 103-1 to 103-3 perform photoelectric conversion on light condensed by the condensing detection units 102-1 to 102-3. The stage 104 is placed with a wafer, which is the sample 1. The condensing detection units 102-1 to 102-3 condenses reflected light from the sample 1 irradiated by the illumination unit 101. The sensor unit 103-4 performs the photoelectric conversion on the light condensed by the condensing detection unit 102-3. The two-dimensional sensor 93 performs the photoelectric conversion on light formed by the condenser lens 91 and the image forming lens 92.

The illumination unit 101 appropriately includes a laser source 2, an attenuator 3, an outgoing beam adjustment unit 4, a beam expander 5, a polarization control unit 6, and a condensing optical unit 7. The condensing detection unit 102-3 is also used as a condensing unit for illumination light when light is incident from a normal direction of the sample 1.

The sensor units 103-1 to 103-3 are line sensors, and a complementary metal-oxide-semiconductor (CMOS) sensor or a charge coupled device (CCD) sensor is used. A two-dimensional CCD image-pickup sensor, a CMOS image-pickup sensor, or a position sensing detector (PSD) is used for the sensor unit 103-4 and the two-dimensional sensor 93.

A light reception surface of the sensor unit 103-1 is the line sensor including an array-like light reception unit at a position conjugate with a linear illumination spot formed on the surface of the sample 1. An angle between an arrangement direction of an array of the light reception unit of the sensor unit 103-1 and an optical axis of the condensing detection unit 102-1 is 10° or more and less than 80°.

A light reception surface of the sensor unit 103-2 is the line sensor including an array-like light reception unit at a position conjugate with the linear illumination spot formed on the surface of the sample 1. An angle between an arrangement direction of an array of the light reception unit of the sensor unit 103-2 and an optical axis of the condensing detection unit 102-2 is 10° or more and less than 80°. Furthermore, the light reception surface of the sensor unit 103-2 and the light reception surface of the sensor unit 103-1 are line-symmetric with respect to a normal of the surface of the sample 1.

The signal processing unit 5200 includes an illumination spot position analysis unit 520, a memory unit 521, a signal integration unit 522, and a defect detection unit 523. The sensor units 103-1 to 103-3 perform the photoelectric conversion on an optical image to perform predetermined sampling, and output digital data by analog-to-digital conversion. After that, the illumination spot position analysis unit 520 analyses a position of the illumination spot from the digital data and stores the position data in the memory unit 521 as scattered light data. Based on the scattered light data, the signal integration unit 522 performs an integration calculation between data in which positions of an illumination spot 20 are different in the same sensor unit 103, and further performs an integration calculation between different sensor units 103.

The defect detection unit 523 extracts a high-frequency/high-luminance unit in the data after performing the integration calculation as a defect. These operations of the signal processing unit 5200 will be described later with reference to FIG. 14.

A laser beam emitted from the laser source 2 is adjusted to have desired beam intensity by the attenuator 3, and is adjusted to a desired beam position and beam traveling direction by the outgoing beam adjustment unit 4. Furthermore, the laser beam is adjusted to have a desired beam diameter by the beam expander 5 and is adjusted to be in a desired polarization state by the polarization control unit 6, and an inspection object region of the sample 1 which is a wafer is irradiated with the laser beam.

An incidence angle (inclination angle with respect to the normal direction of the surface of sample 1) of illumination light relative to the surface of the sample 1 is determined by positions and angles of reflecting mirrors 80 and 82 arranged in an optical path of the illumination unit 101. An incidence angle of an optical axis 120 of the illumination light is set to an angle suitable for detecting a minute defect. An adjustment mechanism unit 81 adjusts the angle of the reflecting mirror 80.

The larger the illumination incidence angle of the laser beam is, that is, the smaller an illumination elevation angle (an angle between the surface of the sample 1 and an illumination optical axis) is, the weaker scattered light (called haze) from minute irregularities on the surface of the sample 1, which is noise, is, with respect to scattered light from a minute foreign matter on the surface of the sample 1. Therefore, the laser beam with a larger illumination incidence angle is suitable for detection of the minute defect.

Therefore, when the scattered light from the minute irregularities of the surface of the sample 1 interferes with the detection of a minute defect, the incidence angle of the illumination light on the surface of the sample 1 is preferably set to 75° or more and less than 90° (the elevation angle of more than 0° and 15° or less).

Meanwhile, in oblique incidence illumination, the smaller the illumination incidence angle is, the more the absolute quantity of the scattered light from the minute foreign matter is. Therefore, when the scattered light from the defect interferes with the detection of the minute defect, the incidence angle of the illumination light on the surface of the sample 1 is preferably set to 60° or more and less than 75° (the elevation angle of 15° or more and 30° or less).

When the oblique incidence illumination is performed, the illumination light is polarized to p-polarized light under polarization control of the polarization control unit 6 of the illumination unit 101, and thus the scattered light from the defect on the surface of the sample 1 increases compared with other polarized light. When the scattered light from the minute irregularities of the surface of the sample 1 interferes with the detection of the minute defect, the illumination light is polarized to s-polarized light, and thus the scattered light from the minute irregularities of the surface of the sample 1 decreases compared with other polarized light. The illumination light may be set to be polarized to 45° polarized light, which is between the P-polarized light and the S-polarized light, or circularly polarized light.

The reflecting mirror 82 can be taken in and out of the optical path by being moved up and down in a Z-axis direction using a drive mechanism (not shown). When the reflecting mirror 82 is removed from the optical path, the illumination light emitted from the polarization control unit 6 is vertically incident on the sample 1 via a reflecting mirror 83, a polarization beam splitter 84, a polarization control unit 85, and the condensing detection unit 102-3. The condensing detection unit 102-3 includes a reflecting mirror 102-33 at a pupil thereof.

Similar to the polarization control unit 6 to be described later, the polarization control unit 85 includes a quarter-wave plate 851 and a half-wave plate 852, and can control any polarized light.

Under a condition that the reflecting mirror 82 is removed from the optical path and the illumination light is vertically incident, the polarization control unit 85 sets the illumination light to be incident on the condensing detection unit 102-3 with the circularly polarized light.

The optical path of the light reflected on the surface of the sample 1 is branched by the reflecting mirror 102-33. The reflected light from the sample 1 reflected on the polarization control unit 85 side by the reflecting mirror 102-33 is converted to linearly polarized light by the quarter-wave plate 851 of the polarization control unit 85. The light is guided to an image forming lens 102-34 by the polarization beam splitter 84 and detected by the sensor unit 103-4.

FIGS. 2A and 2B show a detailed configuration of the condensing detection unit 102-3. FIG. 2B is a cross-sectional view taken along a line A-A in FIG. 2A as seen in a direction of an arrow.

An objective lens 102-31, the reflecting mirror 102-33, and an image forming lens 102-32 are arranged on an optical axis of the condensing detection unit 102-3, and an optical image is formed on the sensor unit 103-3.

As shown in FIG. 2B, the illumination spot 20 is the illumination light irradiated to the surface of the sample 1 and has a linear intensity distribution. The reflecting mirror 102-33 has a shape that is long in a minor axis direction of the illumination spot 20 and is short in a major axis direction.

The reflected light incident on the reflecting mirror 102-33 from the sample 1 is guided to the polarization control unit 85. The reflected light that has passed around the reflecting mirror 102-33 is incident on the image forming lens 102-32.

As shown in FIG. 1, the quantity of light detected by the sensor unit 103-4 is small under a condition of oblique illumination in which the reflecting mirror 82 is inserted into the optical path. Therefore, in the present embodiment, the two-dimensional sensor 93 is used instead of the sensor unit 103-4. That is, in the present embodiment, the reflected light directly reflected on the surface of the sample 1 is incident on the condenser lens 91 and the image forming lens 92 to form an image on the two-dimensional sensor 93.

The defect inspection device 100 monitors the illumination spot 20 using the light detected by the sensor unit 103-4 or the two-dimensional sensor 93.

The laser source 2 emits a laser beam having a wavelength that is difficult to penetrate inside the sample 1 to detect a minute defect near the surface of the sample 1. That is, the laser source 2 emits a short wavelength (a wavelength of 355 nm or less) ultraviolet or vacuum ultraviolet laser beam at a high output of 2 W or more. In the present embodiment, a laser beam having a wavelength of 266 nm is applied. The invention is not limited thereto, any wavelength included in near-ultraviolet rays having a wavelength of 200 to 380 nm or vacuum ultraviolet rays having a wavelength of 10 to 200 nm may be used.

A diameter of an outgoing beam of the illumination unit 101 is about 1 mm. In order to detect a defect inside the sample 1, a wavelength that oscillates a visible or infrared laser beam is used as a wavelength that easily penetrates the inside of the sample 1.

FIG. 3 is a diagram showing a configuration of the attenuator 3.

The attenuator 3 appropriately includes a first polarizing plate 31, a half-wave plate 32 rotatable around an optical axis of the illumination light, and a second polarizing plate 33. The light incident on the attenuator 3 is converted to the linearly polarized light by the first polarizing plate 31, a polarization direction thereof is rotated in any direction in accordance with an azimuth angle of a slow axis of the half-wave plate 32, and the light passes through the second polarizing plate 33.

Light intensity is dimmed at any ratio by controlling the azimuth angle of the half-wave plate 32. When a degree of linear polarization of light incident on the attenuator 3 is sufficiently high, the first polarizing plate 31 is not necessarily required. The attenuator 3 in which a relation between an input signal and a dimming rate is calibrated beforehand, is used. As the attenuator 3, it is possible to use a neutral density (ND) filter having a gradation density distribution and to use and switch a plurality of ND filters having mutually different densities.

Returning to FIG. 1, the description will be continued. The outgoing beam adjustment unit 4 includes a plurality of reflecting mirrors 41 and 42. Here, an embodiment in a case of including two reflecting mirrors 41 and 42 will be described, but the invention is not limited thereto, and three or more reflecting mirrors may be appropriately used. Here, it is assumed that a three-dimensional rectangular coordinate system (XYZ coordinates) is defined, and incident light on the reflecting mirror 41 is traveling in a +X direction.

The reflecting mirror 41 is installed such that the incident light is deflected in a +Y direction. That is, the incident light is incident and reflected in an XY plane in the reflecting mirror 41.

The reflecting mirror 42 is installed such that the light reflected by the reflecting mirror 41 is deflected in a +Z direction. That is, the incident light is incident and reflected in a YZ plane in the reflecting mirror 42. The parallel translation and the angle adjustment are performed on the reflecting mirrors 41 and 42 by using a mechanism (not shown). As a result, a position and a traveling direction (angle) of the light emitted from the outgoing beam adjustment unit 4 are adjusted.

As described above, an incident/reflective surface (XY surface) of the reflecting mirror 41 and the incident/reflective surface (YZ surface) of the reflective mirror 42 are arranged to be orthogonal to each other. As a result, the position and angle adjustment of the light emitted from the outgoing beam adjustment unit 4 (traveling in the +Z direction) in the XZ plane and the position and angle adjustment in the YZ plane can be performed independently.

The beam expander 5 includes lens groups 51 and 52 and has a function of expanding a diameter of an incident parallel light beam. The beam expander 5 is a Galileo type in which the lens group 51 is a concave lens and the lens group 52 is a convex lens. The beam expander 5 is installed on a translation stage having two or more axes (not shown), and the position thereof can be adjusted such that the center coincides with a predetermined beam position. A tilt angle adjustment function for the entire beam expander 5 is provided so that the optical axis of the beam expander 5 and a predetermined beam optical axis coincide with each other.

A magnification of a diameter of a light beam can be controlled by adjusting an interval between the lenses 51 and 52 (a zoom mechanism). When light incident on the beam expander 5 is not parallel, the magnification of the diameter of the light beam and collimation (quasi-parallelization of a light beam) is simultaneously performed by adjusting the interval between the lenses 51 and 52.

The collimation of the light beam may be performed by installing a collimator lens on an upstream side of the beam expander 5 independently of the beam expander 5. The magnification of a beam diameter caused by the beam expander 5 is about 5 to 10 times, and a beam emitted from the light source and having a beam diameter of 1 mm is magnified to have a diameter of about 5 mm to 10 mm.

The polarization control unit 6 includes a half-wave plate 61 and a quarter-wave plate 62, and controls a polarization state of the illumination light to be any polarization state.

FIGS. 4 and 5 are schematic views of a positional relation between the optical axis 120 of the illumination light guided from the illumination unit 101 to the surface of the sample 1 and an illumination intensity distribution shape. A configuration of the illumination unit 101 in FIGS. 4 and 5 shows a part of the configuration of the illumination unit 101 described with reference to FIG. 1, and the outgoing beam adjustment unit 4, the reflecting mirror 82, the adjustment mechanism unit 81, and the like described with reference to FIG. 1 are omitted.

FIG. 4 shows a schematic cross-sectional view of an incidence plane in the oblique incident illumination (a plane including the optical axis 120 of the illumination light and the normal of the surface of the sample 1).

In the oblique incident illumination, the incident light is inclined relative to the surface of the sample 1 within the incidence plane. The illumination unit 101 creates uniform illumination intensity distribution in the incidence plane. As shown in an illumination intensity distribution 1201 on a right side of FIG. 4, the illumination intensity has a Gaussian intensity distribution in a linearly illuminated region on the surface of the sample 1, and the length of the beam width L1 defined at 13.5% of a peak is about 25 µm to 4 mm.

FIG. 5 shows a schematic cross-sectional view of a plane including the normal of the surface of the sample 1 and perpendicular to the incidence plane in the oblique incident illumination.

On this plane, regarding the illumination intensity distribution on the surface of the sample 1, a peripheral intensity is weak with respect to the center, as shown in an illumination intensity distribution 1202 on a right side of FIG. 5. More specifically, the illumination intensity distribution is Gaussian distribution that reflects the intensity distribution of the light incident on the condensing optical unit 7, or intensity distribution similar to a first-kind first-order Bessel function or a sinc function that reflects a shape of an aperture of the condensing optical unit 7.

In order to reduce the haze generated from the surface of the sample 1, the length L2 of illumination intensity distribution on this plane is shorter than the length of the part where the illumination intensity on the incidence plane is uniform, and is about 1.0 µm to 20 µm. The length L2 of illumination intensity distribution refers to a length of a region having the highest illumination intensity of 13.5% or more.

Hereinafter, with reference to FIGS. 6 and 7, the illumination distribution shape (the illumination spot 20) formed on the surface of the sample 1 by the illumination unit 101 and a sample scanning method will be described. The sample 1 is assumed to be a circular semiconductor silicon wafer. The stage 104 includes a translation stage, a rotation stage, and a Z stage for adjusting the height of the surface of the sample (all not shown).

As shown in FIG. 6, the illumination spot 20 has an illumination intensity distribution longitudinal in one direction as described above, and the longitudinal direction is defined as a direction S2 (a direction of L1 in FIG. 4). A direction S1 (a direction of L2 in FIG. 5) is orthogonal to the direction S2. The illumination spot 20 is operated in the circumferential direction S1 of a circle having a rotation axis of the rotation stage as the center by rotational movement of the rotation stage constituting the stage 104. Further, the illumination spot 20 is scanned in the direction S2 of the translation stage by translation movement of the translation stage.

As shown in FIG. 7, when the sample 1 is continuously rotated, the illumination spot 20 draws a spiral locus T1 on the sample 1 by scanning, in the scanning direction S2, by a distance equal to or shorter than the length of the illumination spot 20 in a longitudinal direction while the sample is rotated once, and an entire surface of the sample 1 is scanned.

FIG. 8 shows the scanning of the illumination spot 20 in a configuration with a two-axis translational stage instead of the rotation stage. By scanning the two-axis translational stage in the direction S1, the illumination spot 20 scans the surface of the sample in the direction S1 in a strip shape with the length of the illumination spot 20 at a constant speed. By repeatedly moving the translation stage in the direction S2 at the end of the sample 1 by a scanning width to move a visual field and scanning at a constant speed in the direction opposite to the direction S1, a locus T2 is drawn and the entire surface of sample 1 is scanned.

FIGS. 9A and 9B are block diagrams of a condensing detection unit 102 that detects an optical image 22 of the illumination spot 20 from a direction not orthogonal to the longitudinal direction of the illumination spot 20.

The condensing detection unit 102 corresponds to the condensing detection units 102-1 and 102-2. FIG. 9A is a diagram as viewed from the arrangement direction of light reception units 1031 of the sensor units 103-1 and 103-2 and the +Y direction of FIG. 1. FIG. 9B is a diagram as viewed from a direction orthogonal to the arrangement of the light reception units 1031 of the sensor units 103-1 and 103-2 and a −Z direction of FIG. 1. A condenser lens 1021 is a telecentric optical system so that the magnification does not change even if a working distance changes.

The condensing detection unit 102 includes the condenser lens 1021, a half-wave plate 1022, a polarization beam splitter 1023, a half-wave plate 1024, cylindrical lenses 1025 and 1026, and an image forming lens 1027 in a direction of an optical axis 121. The condensing detection unit 102 includes a beam diffuser 1028 in a direction of the light separated by the polarization beam splitter 1023.

The condensing detection unit 102 condenses light by the condenser lens 1021 and controls the polarization direction thereof by the half-wave plate 1022. The half-wave plate 1022 is rotatable by a drive unit (not shown). The polarization beam splitter 1023 splits the optical path by polarization. The half-wave plate 1024 controls the polarization direction. The paired cylindrical lenses 1025 and 1026 constitute a cylindrical beam expander, and an image forming magnification in a lateral direction of the illumination spot 20 is higher than an image forming magnification in the longitudinal direction. The image forming lens 1027 forms the optical image 22 of the illumination spot 20 on the light reception unit 1031 of the sensor unit 103. The beam diffuser 1028 prevents unwanted light from becoming stray light.

In the light reception unit 1031 of the sensor unit 103, the linear illumination spot 20 irradiated to the surface of the sample 1 is arranged parallel to the longitudinal direction of the optical image 22 formed on the light reception unit 1031 by the condensing detection unit 102. As a result, the sensor unit 103 picks up and outputs the optical image 22 as an electrical signal.

Assuming that the optical axis 121 that detects the light of the condensing detection unit 102 is deviated by an angle θ with respect to the normal direction of the sample 1 and an angle φ with respect to the longitudinal direction of the illumination spot 20, in a three-dimensional space, this optical axis 121 is represented by a vector v0 of the following Equation (1).

[Equation 1]

$$v0 = [\sin\theta\cos\phi \; \sin\theta\sin\phi \; \cos\theta] \quad (1)$$

An angle α (a first angle) formed between the vector v0 of the optical axis 121 of this condensing detection unit 102 and the longitudinal direction (vector v2) of the linear illumination spot 20 irradiated to the sample 1 is obtained by the following Equation (2).

[Equation 2]

$$\alpha = \cos h(\sin\theta\cos\phi) \quad (2)$$

In this case, the defect inspection device 100 detects a section of 2 L in the longitudinal direction of the illumination spot 20 by the sensor unit 103. Depending on a position x from the center of the visual field, the working distance changes as shown by ΔZ shown in the following Equation (3).

[Equation 3]

$$\Delta z = x(\sin\theta\cos\phi), |x| < L \quad (3)$$

An image forming magnification M is determined by the condenser lens 1021 and the image forming lens 1027. The position of the image formed here is expressed by the following Equation (4).

[Equation 4]

$$\Delta Z = M^2 x(\sin\theta\cos\phi), |x| < L \quad (4)$$

Generally, the line sensor is arranged to be orthogonal to the optical axis which is the center of the light beam emitted by the image forming lens. However, in the present embodiment, by inclining the sensor unit 103 with respect to the optical axis 121 by the angle θ, image forming detection without defocus is realized regardless of the change in the working distance in the visual field. In this case, the optical axis 121 (vector v0) incident on the sensor unit 103 and a pixel alignment vector v1 on the light reception surface are in the plane stretched by the vector v2 in the longitudinal direction of the illumination spot 20 and the vector v0, and are set to satisfy the following Equation (5).

[Equation 5]

$$v0 \cdot v1 = M\sin\theta\cos\phi \quad (5)$$

From Equation (5), as the image forming magnification M increases, an inner product of the vector v0 and the vector v1 increases. That is, the angle β formed between the vector v0 and the vector v1 is smaller, and image forming performance deteriorates. For example, when the angle α is 60°, if the image forming magnification M is 2, the incidence angle is 0°, and even if an incident numerical aperture is 0, image forming cannot be performed. In order to prevent the above matter, the image forming magnification M is set to 2 times or less.

Here, the angle β is a second angle formed between the arrangement direction of the array of the light reception units 1031 of the sensor unit 103 and the optical axis 121 of the condensing detection unit 102. It is desirable that the angle β is 10° or more and less than 80°, and a difference from the angle α is 5° or more. This angle β can be obtained from an arc cosine function of Equation (5).

When the image forming magnification M is 2 times or less, the angle β formed between the optical axis 121 (vector v0) incident on the sensor unit 103 from the image forming lens 1027 and the vector v1 can be maximized. When a numerical aperture of the incident light beam of the condenser lens 1021 is N, spread of the light beam emitted to the sensor unit 103 is a reciprocal of the image forming magnification M.

As described above, since the image forming magnification M is set to 2 times or less, when a lens having a large numerical aperture is used as the condenser lens 1021, light from a wide direction is incident on the sensor unit 103. Due to a characteristic of an antireflection film 1033 which will be described later in FIGS. 11 and 12A to 12C, when the incidence angle range of light to the sensor unit 103 is wide, the transmittance of light to the sensor unit 103 is low and high sensitivity is difficult to achieve. Therefore, the image forming magnification M is set to 1 times or more. As a result, the angle β is smaller with respect to the angle α. Typically, by giving a magnification of about 1.2 times, the angle β is smaller than the angle obtained by subtracting 5° from the angle α. Thus, the defect inspection device 100 can improve the quantization efficiency of light and increase the sensitivity.

Here, the image forming magnification M is set to 2 times or less in an image forming magnification $M_X$ in the arrangement direction of the array-like light reception units 1031 of the sensor unit 103. Regarding an image forming magnification $M_Y$ in the direction orthogonal to the arrangement direction of the array-like light reception units 1031 of the sensor unit 103, since the image height is low in the lateral direction of the illumination spot 20 and the risk of defocus is low, there is no such restriction. By increasing the image forming magnification $M_Y$, the incidence angle variation of the light incident on the sensor is small in this direction. Therefore, it is possible to improve the sensitivity of the sensor unit 103 by improving the transmittance to the light reception surface of the sensor. Hence, it is desirable to set the image forming magnification $M_Y$ higher than the image forming magnification $M_X$.

Regarding the cylindrical lenses 1025 and 1026 in the present embodiment, the image forming magnification $M_Y$ in the lateral direction of the illumination spot 20 is higher than the image forming magnification $M_X$ in the longitudinal direction. By increasing the image forming magnification $M_Y$ more than the image forming magnification $M_X$, the sensitivity of the sensor unit 103 can be improved.

As shown in FIG. 9A, the longitudinal direction of the line sensor included in the sensor unit 103 is not parallel to the longitudinal direction of the linear illumination spot 20 irradiated to the surface of the sample 1.

FIG. 9C is a block diagram of the condensing detection unit 102 that detects the image of the illumination spot 20 from a direction orthogonal to the longitudinal direction of the illumination spot 20 as viewed from the light reception unit 1031 of the sensor unit 103 and a direction thereof.

FIG. 9C corresponds to the condensing detection unit 102-3. The sensor unit 103 is arranged such that the center of the light beam incident from the image forming lens 1027 is orthogonal to the arrangement direction of pixels of the sensor unit 103.

FIG. 10 shows a cross-sectional configuration diagram of an image-pickup sensor 1036 constituting the sensor unit 103.

The image-pickup sensor 1036 is configured by laminating the antireflection film 1033, the light reception unit 1031, and a wiring unit 1032 in order from the surface. The incident light 122A to 122C is the light incident on the image-pickup sensor 1036.

The incident light 122A is light on the optical axis 121 shown in FIGS. 9A and 9B. The incident light 122B and 122C are light incident from an angle different from the optical axis 121.

The antireflection film 1033 is a film for preventing surface reflection of the incident light 122A to 122C. The incident light 122A has an angle β with respect to the surface of the antireflection film 1033. The light reception unit 1031 has an array shape, and performs the photoelectric conversion for each divided region, that is, for each pixel. The wiring unit 1032 independently takes out electricity output by the light reception unit 1031 to the outside.

As described above, a sensor having a structure in which the light reception unit 1031 is on the light incident side of the wiring unit 1032 is known as a back side illumination sensor.

In the present embodiment, the incident light is deviated by a predetermined angle from the normal direction of the light reception unit to be incident. Therefore, in the CMOS image-pickup sensor known as front side illumination (FSI), which has a structure in which the wiring unit is on the incident side of the light, the light is absorbed by the wiring unit but sufficient light cannot be incident on the light reception unit.

Further, in an interline type CCD image-pickup sensor, since each vertical transfer CCD and the light reception unit (a photodiode) are alternately arranged in a row, an area of each light reception unit is smaller and the sensitivity is low, compared to the back side illumination type sensor. A full-frame-transfer-type CCD image-pickup sensor does not have such a limitation, but a mechanical shutter is required to prevent light reception during charge transfer.

As shown in the incident light 122A to 122C, the light is incident on the light reception unit 1031 from various directions. Therefore, the antireflection film 1033 cannot obtain good sensitivity with respect to these incident light 122A to 122C unless the antireflection film has a high transmittance.

Generally, an antireflection film of an image-pickup sensor is formed assuming that an incidence angle of light is near 0°. This matter will be described with reference to FIG. 11.

FIG. 11 is a graph showing the transmittance of light passing through the light reception unit 1031 made of Si, from the light incident side, in a case where the antireflection film 1033 is formed by a four-layer thin film of SiN having a thickness of 27 nm, $SiO_2$ having a thickness of 44 nm, SiN having a thickness of 30 nm, and $SiO_2$ having a thickness of 80 nm, and light having a wavelength of 266 nm is incident. A horizontal axis of the graph shows the incidence angle, and a vertical axis of the graph shows the transmittance.

A curve 10331 shows a transmittance characteristic of the s-polarized light. A curve 10332 shows a transmittance characteristic of the p-polarized light.

The transmittance is high when the incidence angle of light is 0°, that is, when the light is incident from the normal direction. However, as the incidence angle of light increases, the transmittance decreases. Specifically, when the incidence angle of light is near 25°, the transmittance of the s-polarized light decreases to 0.5, and when the incidence angle is near 33°, the transmittance of the p-polarized light decreases to 0.5. When the incidence angle is near 45°, the transmittance of the s-polarized light significantly decreases to 0.1, and the transmittance of the p-polarized light significantly decreases to 0.3.

As described above, it can be seen that even if the general antireflection film is formed on the light reception unit 1031, good sensitivity cannot be obtained due to the incidence angle of light.

FIG. 12A is a graph showing a characteristic of the antireflection film 1033 formed by one layer of $HfO_2$ having a thickness of 25 nm. A horizontal axis of the graph shows the incidence angle, and a vertical axis of the graph shows the transmittance.

A curve 10333 shows a transmittance characteristic of the s-polarized light. A curve 10334 shows a transmittance characteristic of the p-polarized light. The transmittance of the p-polarized light decreases as the incidence angle increases, but the transmittance decreases to 0.5 around the incidence angle of 60°.

Further, the incidence angle is increased to about 70°, and the transmittance of the s-polarized light is 70% or more in the region where an incidence angle is 0° to 80°. However, the sensor units 103-1 and 103-2 need to be tilted by a predetermined angle in order to realize the image forming detection without defocus regardless of the change in the working distance in the visual field.

That is, it is desirable that the normal of the light reception surface of the sensor unit 103-1 is tilted by, for example, 10° to 80° from an optical axis 121-1 of the condensing detection unit 102-1.

In order to maximize the performance of the antireflection film 1033 of the present embodiment, it is preferable to control the rotation angle of the half-wave plate 1024 of FIG. 9A so that the s-polarized light is incident on the sensor unit 103. Further, by increasing the magnification of the expander formed by the paired cylindrical lenses 1025 and 1026 of FIG. 9B, it is possible to realize a substantially linear polarization incidence.

In the present embodiment, $HfO_2$ is used as a substance constituting a film type, but $Si_3N_4$ is used as a substance having a similar refractive index with respect to the incident light (ultraviolet rays) having a wavelength of 266 nm, and thus even if $Si_3N_4$ is applied to the antireflection film, almost the same characteristic can be obtained. The refractive index of $HfO_2$ for the incident light having a wavelength of 266 nm is (2.1, 0).

Meanwhile, the refractive index of $Si_3N_4$ for the incident light having a wavelength of 266 nm is (2.21, 0.0013) Since an extinction coefficient of Si, which is the light reception surface, is large, it is easy to obtain the good transmittance characteristic when the refractive index is large, as the characteristic of the antireflection film. $Si_3N_4$ has a higher refractive index, but has a problem that the extinction coefficient is not 0. A final performance obtained as the transmittance characteristic of $Si_3N_4$ is almost the same as that of $HfO_2$.

Further, in the present embodiment, the characteristic of the antireflection film with respect to the incident light having a wavelength of 266 nm are shown, and $HfO_2$ has a large refractive index up to the incident light having a wavelength near 190 nm, but has a relatively small extinction coefficient. Therefore, a sensor using $HfO_2$ as the antireflection film can realize good sensor sensitivity for the incident light having a wavelength of 190 nm or more and 355 nm or less.

FIG. 12B is a graph showing a characteristic of the antireflection film 1033 formed by two layers of SiN having a thickness of 36.8 nm and $SiO_2$ having a thickness of 90 nm. A horizontal axis of the graph shows the incidence angle, and a vertical axis of the graph shows the transmittance.

A curve 10335 shows a transmittance characteristic of the s-polarized light. A curve 10336 shows a transmittance characteristic of the p-polarized light. When the incidence angle of the incident light 122A is 50°, the transmittance shown by the curve 10335 at 50° is better than that of the curve 10333 shown in FIG. 12A. That is, it is desirable that the normal of the light reception surface of the sensor unit 103-1 is tilted by, for example, 45° to 55° from the optical axis 121-1 of the condensing detection unit 102-1.

However, a region with good transmittance is a section with the incidence angle of 45° to 55° having a width of about 10°, and when the numerical aperture of the condenser lens 1021 is large, the characteristic cannot be said to be good.

FIG. 12C is a graph showing a characteristic of the antireflection film 1033 formed of SiN having a thickness of 36.8 nm, $SiO_2$ having a thickness of 46 nm, SiN having a thickness of 33.5 nm, and $SiO_2$ having a thickness of 94 nm. A horizontal axis of the graph shows the incidence angle, and a vertical axis of the graph shows the transmittance.

The transmittance characteristic of the s-polarized light shown by a curve 10337 is very good at an incidence angle of 50°, but an incidence angle range with good transmittance is smaller than that of the two-layer state shown in FIG. 12B, and the transmittance of the p-polarized light shown by a curve 10338 is inferior to that of the s-polarized light at a peak position. In this case, it is desirable that the normal of the light reception surface of the sensor unit 103-1 is tilted by, for example, 45° to 55° from the optical axis 121-1 of the condensing detection unit 102-1.

Both the characteristics of the antireflection film 1033 shown in FIGS. 12B and 12C are such that the SiN film on the incident side of light is about 37 nm, which is thicker than the film thickness of 27 nm of the SiN film shown in FIG. 11. As a result, in the present embodiment, the reflection of the SiN film on the large incident film and the reflection from the light reception unit formed of Si are interfered with each other to prevent the reflection and improve the transmittance.

As shown in the above comparison, it is desirable that the antireflection film 1033 is formed by one layer under the condition of the invention, that is, in a case in which the optical axis 121 incident on the sensor unit 103 is deviated from the normal direction of the light reception unit 1031 and the angle of the incident light beam varies.

A peak characteristic of the two-layer curve 10335 and peak characteristics of the four-layer curves 10336 and 10337 are better than the characteristic of the curve 10333. In order to take advantage of the good transmittance characteristics, it is preferable to collimate the light incident on the sensor unit 103.

FIG. 13 is a diagram showing an image-pickup sensor 1036a that collimates the incident light.

The image-pickup sensor 1036a is configured by laminating a cylindrical lens array 1035, the antireflection film 1033, the light reception unit 1031, and the wiring unit 1032 in order from the surface. Among these, the antireflection film 1033, the light reception unit 1031, and the wiring unit 1032 are the same as the image-pickup sensor 1036 shown in FIG. 10.

The cylindrical lens array 1035 is an array of cylindrical lenses made of synthetic quartz. A lens pitch of the cylindrical lens array 1035 is formed to be equal to a pitch of the light reception unit 1031. The incident light 122A has the angle β with respect to the surface of the cylindrical lens array 1035.

The cylindrical lens array 1035 is arranged such that an image of the light beam emitted from the image forming lens 1027 (FIGS. 9A to 9C) is formed in the cylindrical lens array 1035 and the light emitted from the cylindrical lens array 1035 is collimated. A pitch between the cylindrical lens array 1035 and the light reception unit 1031 is shifted such that the light collimated by each cylindrical lens is incident on each pixel of the light reception unit 1031.

By using such an image-pickup sensor 1036a, the antireflection film 1033 can be formed of two layers or four layers.

FIG. 14 illustrates the deviation of the optical image in the sensor unit 103 when the sample 1 is deviated by ΔZ in the configuration of FIG. 1.

An image-pickup sensor 1036-1 is included in the sensor unit 103-1. An image-pickup sensor 1036-2 is included in the sensor unit 103-2. An image-pickup sensor 1036-3 is included in the sensor unit 103-3.

In the sample 1, the illumination spot 20 is illuminated by the irradiation of the laser beam. A defect 15 is formed on the surface of sample 1.

In this case, an optical image 22-1 of the illumination spot 20 and an optical image 151-1 of the defect 15 are formed on a surface of the image-pickup sensor 1036-1. An optical image 22-2 of the illumination spot 20 and an optical image 151-2 of the defect 15 are formed on a surface of the image-pickup sensor 1036-2. An optical image 22-3 of the illumination spot 20 and an optical image 151-3 of the defect 15 are formed on a surface of the image-pickup sensor 1036-3.

Here, a sample 11 which is deviated by ΔZ with respect to the sample 1 is considered. The illumination spot 21 is a region in which the surface of the sample 11 is illuminated with a predetermined illumination intensity by irradiation with the laser beam. The position of the illumination spot 21 is deviated as the sample 1 is deviated by ΔZ. A defect 16 is obtained by deviating the defect 15 of sample 1 by ΔZ.

When the image is picked up, an optical image 23-1 of the illumination spot 21 and an optical image 161-1 of the defect 16 are formed on the surface of the image-pickup sensor 1036-1. An optical image 23-2 of the illumination spot 21 and an optical image 161-2 of the defect 16 are formed on the surface of the image-pickup sensor 1036-2. An optical image 23-3 of the illumination spot 21 and an optical image 161-3 of the defect 16 are formed on the surface of the image-pickup sensor 1036-3.

Here, the optical axis 121-1 of the condensing detection unit 102-1 and an optical axis 122-2 of the condensing detection unit 102-2 are line-symmetric with respect to the normal of the sample 1. Further, an optical axis 122-3 of the condensing detection unit 102-3 coincides with the normal direction of the surface of the sample 1.

Assuming that the incidence angle of the optical axis 120 of the illumination light is $\theta_1$, the illumination spot 20 is deviated to the position of the illumination spot 21 due to the deviation of the sample 1 by ΔZ. In this case, a deviation amount Δspot of the position of an optical image 23 of the illumination spot 21 with respect to an optical image 22 of the illumination spot 20 is expressed by the following Equation (6).

[Equation 6]

$$\Delta spot = \Delta Z/\tan\theta_1 + \alpha \tag{6}$$

Here, μ is the deviation of the illumination spot 21.

Assuming that an elevation angle of the condensing detection unit 102-2 is $\theta_2$, in the image-pickup sensor 1036-2, a deviation amount ΔS2_2 from the optical image 151-2 of the defect 15 with respect to the optical image 161-2 of the defect 16 due to the deviation of the surface of the sample 1 by ΔZ is expressed by the following Equation (7).

[Equation 7]

$$\Delta S2\_2 = -\Delta Z/\tan\theta 2 \tag{7}$$

Positive and negative of a deviation amount ΔS2_1 between the optical image 161-1 of the defect 16 and the optical image 151-1 of the defect 15 formed on the image-pickup sensor 1036-1 is inverted with respect to ΔS2_2. A deviation amount Δspot2 of the optical image 23-2 of the illumination spot 21 from the optical image 22-2 of the illumination spot 20 in the image-pickup sensor 1036-2 is expressed by the following equation (8).

[Equation 8]

$$\Delta spot2 = -\Delta Z/\tan\theta 2 + \Delta Z/\tan\theta 1 + \alpha \tag{8}$$

A deviation amount Δspot1 of the optical image 23-1 of the illumination spot 21 from the optical image 22-1 of the illumination spot 20 in the image-pickup sensor 1036-1 is expressed by the following equation (9).

[Equation 9]

$$\Delta spot1 = \Delta Z/\tan\theta 2 + \Delta Z/\tan\theta 1 + \alpha \tag{9}$$

When Δspot2 is subtracted from Δspot1, the positional deviation of the illumination spot 21 can be canceled. This matter is expressed by the following Equation 10.

[Equation 10]

$$\Delta spot1 - \Delta spot2 = 2\Delta Z/\tan\theta 2 \tag{10}$$

Δspot1 and Δspot2 are calculated by a position of a center of gravity of the haze light quantity of the image sensor 1036-1 and the image-pickup sensor 1036-2. Furthermore, by obtaining $2\Delta Z^{\infty}/\tan\theta_2$ and obtaining ΔS2_2 from Equation (7), the deviation amount of the optical image of the defect 15 on the sensor surface can be obtained.

In the present embodiment, since a one-dimensional sensor is used for the sensor units 103-1 and 103-2, the positional deviation of the illumination spot 21 with respect to the direction S1 cannot be measured. Therefore, the positional deviation of the illumination spot 21 with respect to the direction S1 may be measured by the two-dimensional sensor 93 or the sensor unit 103-4.

FIG. 15 is a diagram showing functional blocks included in the signal processing unit 5200 and operations thereof.

Sensors 103-A to 103-N transfer data for m pixels to the signal processing unit 5200.

The illumination spot position analysis unit 520 calculates the deviation amount ΔZ by Equation (10), and then applies a band-pass filter in a time direction, that is, the direction S1 to extract a defect signal. The illumination spot position analysis unit 520 stores the extracted data in the memory unit 521.

Blocks 521A to 521N store data corresponding to sensors 103-A to 103-N, respectively. Signals 521Aa to 521Am show spiral scanning data from an a-th circumference to an m-th circumference of the sensor 103-A. Signals 521Na to 521Nm show spiral scanning data from the a-th circumference to the m-th circumference of the sensor 103-N.

The signal integration unit 522 includes inter-sensor integration units 5220-1 to 5220-$n$ and light quantity calculation units 5221-1 to 5221-$n$. The inter-sensor integration units 5220-1 to 5220-$n$ synthesize a linear sum signal obtained by multiplying the signals 521Aa to 521Am, . . . , 521Na to 521Nm of the sensors 103-A to 103-N stored in the memory unit 521 by a predetermined gain.

As shown in Equation (7), the detected defect causes a positional deviation in the different directions S2 in the sensor units 103 due to the height fluctuation of the surface of the sample. Therefore, in the present embodiment, in consideration of this positional deviation, data is read from the memory unit 521 to synthesize data indicating the same position on the surface of the sample.

The scanning data 5220$a$–1 to 5220$m$–1 around the a-th to m-th circumferences are obtained by synthesizing the signals of the blocks 521A to 521N using a predetermined gain set G1. The scanning data 5220$a$-$n$ to 5220$m$-$n$ around the a-th to m-th circumferences are obtained by synthesizing the signals of the blocks 521A to 521N using a predetermined gain set Gn.

The light quantity calculation units 5221-1 to 5221-$n$ synthesize scanning data 5220$a$–1 to 5220$m$–1, . . . , 5220$a$-$n$ to 5220$m$-$n$ from the a-th circumference to the m-th circumference obtained by scanning the same position a plurality times, and calculate the quantity of light for a defect candidate. Here, in the scanning, the quantity of light at the same position cannot be added unless the illumination spot 20 is stable in the direction S1. Therefore, the deviation amount in the direction S1 is measured and corrected by the sensor unit 103-4 or the two-dimensional sensor 93, and the data obtained by different scanning is corrected.

The defect detection unit 523 determines that there is a defect when any of the quantity of light of the defect candidates calculated by the light quantity calculation units 5221-1 to 5221-$n$ exceeds a threshold value set for each gain set. The defect detection unit 523 further outputs information on the quantity of light of the defect and the position where the defect is detected to the control unit 53 shown in FIG. 1. The control unit 53 causes the display unit 54 or the like to display information on the quantity of light of the defect and the position where the defect is detected.

INDUSTRIAL APPLICABILITY

The invention can be used in an inspection step of inspecting a foreign matter or a defect attached to a surface of a semiconductor wafer in a manufacturing process of a semiconductor device.

REFERENCE SIGN LIST 1 sample
2 laser source
4 outgoing beam adjustment unit (illumination scanning unit)
5 beam expander
6 polarization control unit
7 condensing optical unit
5200 signal processing unit
53 control unit 54 display unit
55 input unit
91 condenser lens
92 image forming lens
93 two-dimensional sensor
101 illumination unit (illumination optical system)
102-1, 102-2, 102-3 condensing detection unit
103-1, 103-2, 103-3 sensor unit
1031 light reception unit (light reception surface)
1032 wiring unit
1033 antireflection film
104 stage

The invention claimed is:

1. A defect inspection device comprising:
an illumination optical system configured to irradiate a surface of a sample with a linear illumination spot;
a condensing detection unit configured to condense reflected light of the linear illumination spot from the surface of the sample; and
a sensor unit configured to form an optical image of the illumination spot by the condensing detection unit on a light reception surface formed with an antireflection film and output the optical image as an electrical signal, wherein
the condensing detection unit includes a condenser lens which condenses reflected light from the illumination spot on the surface of the sample, a polarization control unit configured to split an incident light into two desired polarization directions using a first wave plate changing polarization direction of the incident light and a polarization beam splitter splitting the incident light passing through the first wave plate and a second wave plate changing the polarization direction of the light output from the polarization direction to a specific angle that maximizes a transmittance of the antireflection film of the sensor unit to be maximized and an image forming lens converging a light beam passing through the second wave plate onto a light reception unit of the sensor unit,
the condensing detection unit further being configured to form an angle between the light axis of the condensing detection unit and a longitudinal direction of the linear illumination spot, α, which is 10° or more and less than 80°, and
the sensor unit is a line sensor provided with the light reception unit at a position conjugate with the linear illumination spot formed on the surface of the sample and in which an angle between the light axis of the condensing detection unit and a pixel alignment direction on the light reception unit, β, is 10° or more and less than 80°.

2. The defect inspection device according to claim 1, wherein
the second wave plate is a half-wave plate, and a rotation angle of the second wave plate is controlled such that s-polarized light is incident on the sensor unit.

3. The defect inspection device according to 1, wherein the condensing detection unit includes a telecentric optical system.

4. The defect inspection device according to claim 1, wherein
an image forming magnification in a direction orthogonal to the pixel alignment direction of the sensor unit of the condensing detection unit is higher than an image forming magnification in the pixel alignment direction of the sensor unit, and a width orthogonal to the pixel alignment direction of the light reception unit of the sensor unit is wider than a width in a lateral direction of an image obtained by forming an image of the illumination spot on the sensor unit.

5. The defect inspection device according to claim 1, wherein
an image forming magnification in the pixel alignment direction of the condensing detection unit is 1 time or more and 2 times or less.

6. The defect inspection device according to claim 1, wherein
the light reception unit of the sensor unit is arranged on an incident side of light with respect to a wiring layer that transmits the output electric signal of the light reception unit.

7. The defect inspection device according to claim 1, wherein
the antireflection film has a higher transmittance of the light incident from the light axis direction of the condensing detection unit to the light reception unit than a transmittance of the light incident from a normal direction of the light reception unit to the light reception unit.

8. The defect inspection device according to claim 7, wherein
a wavelength of the light irradiated from the illumination optical system is 190 nm to 355 nm, and
the antireflection film is formed of one layer of $HfO_2$ or one layer of $Si_3N_4$.

9. The defect inspection device according to claim 7, wherein
a lens array is arranged on the incident side of the light of the light reception unit of the sensor unit.

10. The defect inspection device according to claim 1 further comprising:
an illumination scanning unit configured to scan the illumination spot on the surface of the sample.

11. A defect inspection method comprising:
a step of irradiating a surface of a sample with a linear illumination spot by an illumination optical system;
a step of condensing reflected light of the linear illumination spot from the surface of the sample by a condensing detection unit;
a step of controlling the polarization direction of light incident from the illumination spot using a polarization control unit to branch by the polarization;
a step of emitting the reflected light to a sensor unit to form an optical image of the illumination spot; and
a step of outputting the optical image as an electric signal by the sensor unit, wherein
the step of controlling the polarization direction of light incident from the illumination spot further comprises splitting an incident light into two desired polarization directions using a first wave plate to change a polarization direction of the incident light and a polarization beam splitter to split the incident light passing through the first wave plate and a second wave plate to change a polarization direction of the light output from the first wave plate to a specific angle that maximizes a transmittance of an antireflection film of the sensor unit, and converging a light beam passing through the second wave plate onto a light reception unit of the sensor unit,
the step of condensing reflected light of the linear illumination spot from the surface of the sample further comprises forming an angle between the light axis of the condensing detection unit and a longitudinal direction of the linear illumination spot, a, which is 10° or more and less than 80°, and the sensor unit is a line sensor provided with the light reception unit at a position conjugate with the linear illumination spot formed on the surface of the sample and in which an angle between the light axis of the condensing detection unit and a pixel alignment direction on the light reception unit, $\beta$, is 10° or more and less than 80°.

12. The defect inspection method according to claim 11, wherein the two desired polarization directions of the split incident light is s-polarized light.

\* \* \* \* \*